(12) United States Patent
Allan

(10) Patent No.: US 12,287,266 B2
(45) Date of Patent: Apr. 29, 2025

(54) PARTICULATE MATTER IMAGING, IDENTIFICATION, AND ANALYSIS SYSTEMS AND METHODS

(71) Applicant: Pollen Sense LLC, Provo, UT (US)

(72) Inventor: Nathan Allan, Mapleton, UT (US)

( * ) Notice: Subject to any disclaimer, the term of this patent is extended or adjusted under 35 U.S.C. 154(b) by 0 days.

(21) Appl. No.: 18/508,081

(22) Filed: Nov. 13, 2023

(65) Prior Publication Data

US 2024/0192107 A1      Jun. 13, 2024

Related U.S. Application Data

(63) Continuation of application No. 17/002,733, filed on Aug. 25, 2020, now Pat. No. 11,815,441.

(60) Provisional application No. 62/891,385, filed on Aug. 25, 2019.

(51) Int. Cl.
| | |
|---|---|
| *G01N 15/0205* | (2024.01) |
| *G01N 15/1433* | (2024.01) |
| *G06T 7/174* | (2017.01) |
| *G06T 7/571* | (2017.01) |
| *H04N 25/44* | (2023.01) |

(52) U.S. Cl.
CPC ..... *G01N 15/0205* (2013.01); *G01N 15/1433* (2024.01); *G06T 7/174* (2017.01); *G06T 7/571* (2017.01); *H04N 25/44* (2023.01); *G06T 2207/20012* (2013.01)

(58) Field of Classification Search
CPC .......... G01N 15/0205; G01N 15/1463; G01N 2015/1445; G01N 2015/1452; G01N 15/1468; G01N 15/0612; G06T 7/174; G06T 7/571; G06T 2207/20012; H04N 5/345; G02B 21/367
See application file for complete search history.

(56) References Cited

U.S. PATENT DOCUMENTS

2017/0213330 A1      7/2017   Pudipeddi et al.
2019/0327421 A1*   10/2019   Emmerich ......... G02B 23/2484

OTHER PUBLICATIONS

Tian, J. and Chen, L., 2012. Adaptive multi-focus image fusion using a wavelet-based statistical sharpness measure. Signal Processing, 92(9), pp. 2137-2146.*
Hao, Y., Sun, Z. and Tan, T., Nov. 2007, Comparative studies on multispectral palm image fusion for biometrics. In Asian conference on computer vision (pp. 12-21). Springer, Berlin, Heidelberg.*
(Continued)

*Primary Examiner* — Zhitong Chen
(74) *Attorney, Agent, or Firm* — Intellectual Strategies

(57) ABSTRACT

Imaging systems and methods for capturing an image of a subject. The imaging system includes an imaging device that captures images of the subject, a focus mechanism for changing a focal length of the imaging device, and a controller that processes images captured by the imaging device. The imaging device captures a plurality of images of the subject at each of a plurality of focal lengths. The controller generates a sharpness map for each of the plurality of images of the subject at each of the plurality of focal lengths and a composite image of the subject by blending together the plurality of images at each of the plurality of focal lengths into a single image based on the sharpness maps.

18 Claims, 17 Drawing Sheets

---

Capturing a plurality of images of the subject at a plurality of focal lengths, wherein, at each focal length, the imaging device captures a white reference image while white light is incident on the subject, and a color image while light of one or more colors is incident on the subject.
1802

↓

Generating a normal map image for each focal length by comparing the white reference image of a particular focal length to the color image of that focal length.
1804

↓

Generating a combined image for each focal length by blending the normal map image for a particular focal length with the white reference image of that focal length.
1806

↓

Generating a composite subject image by blending the combined images of each of the plurality of focal lengths together into a single image.
1808

(56) References Cited

OTHER PUBLICATIONS

Paul, S., Sevcenco, I.S. and Agathoklis, P., 2016. Multi-exposure and multi-focus image fusion in gradient domain. Journal of Circuits, Systems and Computers, 25(10), p. 1650123.*

Kim, H., Cho, K., Kim, S., Kim, J. and Jin, K., 2015. Quick light mixing of multiple color sources for image acquisition using pattern search. International Journal of Precision Engineering and Manufacturing, 16(11), pp. 2353-2358.

* cited by examiner

Capturing a plurality of images of the subject at a plurality of focal lengths, wherein, at each focal length, the imaging device captures a first image of the subject using a first lighting configuration and a second image of the subject using a second lighting configuration that is different than the first lighting configuration.
1702

Generating a combined image for each focal length by blending the first image for a particular focal length with the second image of that focal length.
1704

Generating a composite subject image by blending the combined images of each of the plurality of focal lengths together into a single image.
1706

FIG. 17

PARTICULATE MATTER IMAGING, IDENTIFICATION, AND ANALYSIS SYSTEMS AND METHODS

CROSS REFERENCE TO RELATED APPLICATIONS

This application is a continuation of U.S. Non-Provisional patent application Ser. No. 17/002,733, filed Aug. 25, 2020, which claims the benefit of U.S. Provisional Patent Application No. 62/891,385, filed Aug. 25, 2019 titled "OMNI-DEPTH IMAGE GENERATION AND ANALYSIS," both of which are incorporated herein by reference in its entirety, including but not limited to those portions that specifically appear hereinafter, the incorporation by reference being made with the following exception: In the event that any portion of the above-referenced applications is inconsistent with this application, this application supersedes said above-referenced applications.

TECHNICAL FIELD

The disclosure relates generally to imaging and identifying collected matter, and more particularly relates to systems, methods, and devices for imaging, identifying, and analyzing airborne particulate matter, but may also be used to collect other types of particulate matter such as waterborne particulate matter, particulate matter that accumulates on a surface, or any particulate matter disposed on/in any solid, liquid, or gaseous medium.

BACKGROUND

Ambient air, both indoors and outdoors, includes aerosols/airborne particulate matter. This airborne particulate matter may include dust, pollen, chemical particles, pollutants, and various other elements, particles, and/or compounds that may be organic, naturally occurring, or synthetic. Some of these airborne materials may be harmful to humans that breathe such materials into their respiratory systems. Airborne particulates have been linked to detrimental health effects in humans. For example, airborne particulates are known to aggravate respiratory illnesses and have led people to be hospitalized for allergies, asthma, difficulty breathing, and other respiratory and medical difficulties.

Short-term exposure (minutes, hours, or days) to certain airborne particulate matter or elevated levels of airborne particulates may cause aggravation of allergies, asthma, and other respiratory difficulties in human beings. Longer-term exposures, over several years or decades, to elevated levels of certain airborne particulate matter has even greater health risks and may affect bodily systems apart from the respiratory system. For example, long term exposure may permanently damage the respiratory system and may lead to greater risk of heart disease and other chronic, possibly incurable conditions.

Additionally, airborne particulate matter may have significant harmful effects on plants and animal life, and is, therefore, significantly important to consider for its environmental, horticultural, ecological, biological, and economic impacts, as well as the expansion of current scientific knowledge.

Certain airborne particulates have increased in prevalence in recent decades and new airborne particulates may also become present in the ambient air in the future. Due to this increase, the prevalence of allergies, asthma, and other respiratory conditions and illnesses have also become more prevalent. Such trends and increases are forecasted to intensify with the passage of time.

The increase in respiratory illness due to increase in airborne particulate matter may be lessened by identifying types and levels of airborne particulate matter contained in the ambient air and formulating proper and effective mitigation strategies for reducing the levels of airborne particulate matter in the air. Additionally, diagnoses, medicines, and treatments can be improved by knowing what types and levels of airborne particulate matter are present in the ambient air. Accordingly, knowledge about types, levels, composition, concentration, and distributions of airborne particulate matter in the ambient air and environment can significantly lessen burdens on people, medical systems, governments, and economies caused by respiratory illness and aggravation of other related health conditions.

Similarly, other objects or particulate matter (e.g., waterborne particulate matter, fluid-borne particulate matter, pollutants, particulate matter that accumulates on surfaces, and/or any subject or particulate matter dispersed in or accumulated on any solid, liquid, or gaseous medium) may cause significant harmful effects to humans, animals, plants, environments, economies, and are, therefore, significantly important to consider for their environmental, horticultural, ecological, biological, and economic impacts. Accordingly, although this disclosure specifically discusses sampling and imaging of airborne particulate matter, any form of matter or particulate matter that may be imaged and analyzed may be imaged and analyzed using the methods, systems, devices, and computer-based products described herein.

Sampling devices have been developed to collect and image particulate matter, and to identify and measure the collected particulate matter based on images captured of the particulate matter. However, current imaging methods, systems, and devices for imaging particulate matter are limited in their capability and reliability in generating consistently sharp and sufficiently detailed images of samples that contain particulate matter of many different types, sizes, and shapes.

For example, current imaging methods take an image of a sample. However, in an image of a particulate sample, different sizes, shapes, of particulate matter, as well as distances of particulate matter from an imaging device, may cause certain matter in the sample/image to be in-focus at the image's focal length while other particulate matter in the sample/image may be out of focus at that focal length. Furthermore, some lighting configurations for imaging particulate matter do not provide sufficient information in a captured image to ensure proper focus, visibility, and clarity of the particulate matter in an image. Accordingly, current methods of imaging a subject/sample may lead to images of particulate matter that where not all matter is completely in focus and sufficiently detailed to allow for clear imaging and accurate identification of all particulate matter in an air sample. Furthermore, current methods of imaging particulate matter do does not adequately identify detail and characteristics of shape, color, size, or other visual characteristics of particulate matter.

Because of the seriousness of detrimental effects particulate matter can have on humans, plants, and the environment, there exists a need for quicker, simpler, more reliable, more efficient, and more detailed collection, imaging, measurement, identification, and analysis of the composition and concentration of particulate matter. Additionally, systems and sampling devices with the ability to identify more characteristics (e.g. color, size, shape, or other visual properties) of particulate matter are needed. Therefore, it is desirable to develop an imaging system, method, and device for sampling, imaging, and identifying particulate matter that allows more detailed, clearer, and more reliable sampling, imaging, and identification of particulate matter.

Furthermore, it is generally desirable in the fields of imaging and microscopy for image clarity, sharpness, and detail to be improved. In the imaging of any subject at any size (whether microscopic, larger, or smaller) new methods, systems, and devices are continually desired to ensure generation of images with increased clarity, sharpness, and detail. Therefore, it is desirable to develop an imaging system, method, and device imaging any subject matter that allows more detailed, clearer, and more reliable imaging of the matter being imaged.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 17 is a block diagram illustrating a method for imaging a subject as described herein.

DETAILED DESCRIPTION

Figure 1A:
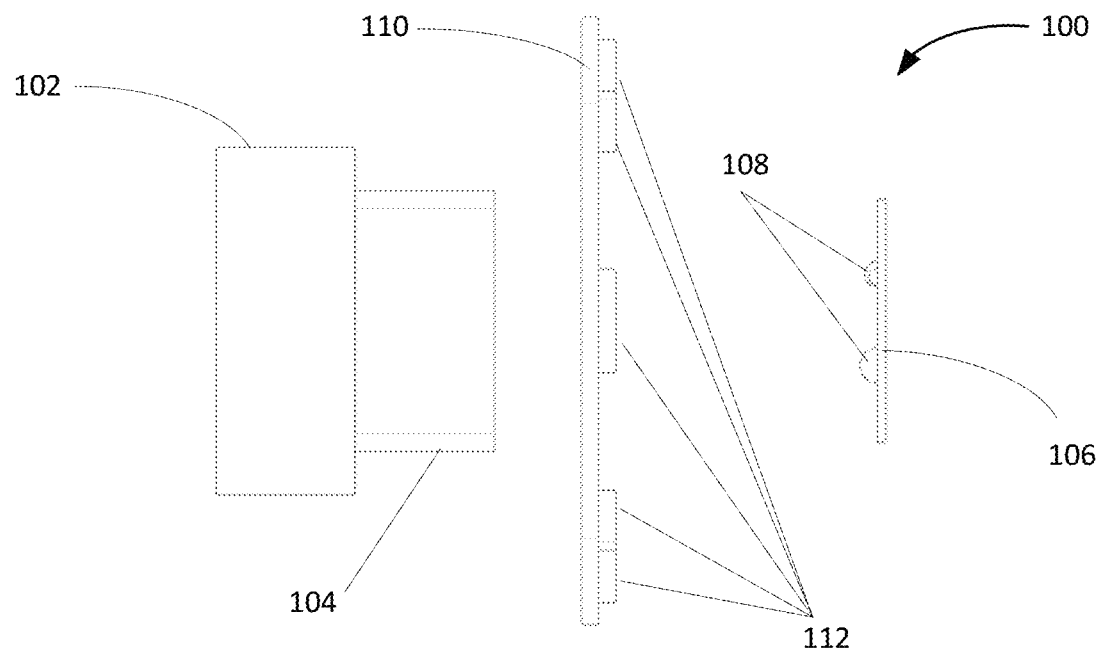
FIG. 1A illustrates a side view of an example imaging system according to one embodiment, including a camera, a lens element, a light ring, and a surface including collected matter.

Disclosed herein are systems, methods, devices, and computer-based products for imaging, identification, and analysis of subjects such as, for example, particulate matter, including airborne particulate matter in the ambient air. An embodiment of the disclosure is an imaging system for imaging, identifying, and analyzing airborne particulate matter with an imaging device. Such methods, systems, devices, and computer-based products disclosed herein provide for imaging, identification, and analysis of any object or subject including aerosols, airborne particulate matter, airborne substances, and the like in ambient air.

Although the examples and embodiments described herein are directed to imaging particulate matter such as dust, pollen, chemical particles, pollutants, and various other elements, particles, and/or compounds, it will be appreciated that the imaging methods, systems, devices, and computer-based products described herein may be applied to the imaging of any subject or matter. Thus, while many portions of this specification are directed to the specific application of imaging airborne particulate matter, the imaging methods described herein are advantageous and useful to any imaging application and the imaging of any subject.

The imaging devices, systems, methods, and computer-based products described herein may be used for imaging, analyzing, and identifying particulate or other matter in/on any medium such as ambient air, water, a solid surface or any other gaseous, liquid, solid material or any composition of matter. For example, harmful particulate matter may be contained in water sources for sanitation and/or drinking. Accordingly, imaging of waterborne particulate matter may be useful to determine types and levels of such particulate mate. Imaging, analysis, and identification of such waterborne particulate matter may be carried similar to the imaging, analysis, and identification of airborne particulate matter described herein.

An embodiment of the disclosure is an imaging system and method for capturing an image of a subject comprising an imaging device that captures images of the subject, a focus mechanism for changing a focal length of the imaging device, and a controller that processes images captured by the imaging device. In an embodiment, the imaging device captures one or more images of the subject at each of a plurality of focal lengths. In an embodiment, the controller generates a sharpness map for each of the one or more images of the subject at each of the plurality of focal lengths. In an embodiment, the controller generates a composite image of the subject by blending together the one or more images at each of the plurality of focal lengths into a single image based on the sharpness maps.

In an embodiment, each sharpness map indicates a sharpness level for each pixel of its corresponding image of the one or more images of the subject at each of the plurality of focal lengths. The blending together the one or more images of the subject at each of the plurality of focal lengths into a single image is based on the sharpness levels in the sharpness maps.

In an embodiment, the controller generates each sharpness map by determining a sharpness level for each pixel in a particular image of the one or more images of the subject at each of the plurality of focal lengths, generating a raw sharpness map for the particular image of the one or more images of the subject at each of the plurality of focal lengths based on the sharpness levels determined for each pixel, and generating an expanded sharpness map based on the raw sharpness map by creating expanded areas around high sharpness pixels in the raw sharpness map to a size including additional sharpness information surrounding the high sharpness pixels. In an embodiment, the controller generates the composite image of the subject by blending together the one or more images of the subject at each of the plurality of focal lengths into a single image based on the expanded sharpness maps. In an embodiment, higher sharpness areas of a first image of the one or more images of the subject at each of the plurality of focal lengths are weighted above corresponding lower sharpness areas in a second image of the one or more images of the subject at each of the plurality of focal lengths to be more prevalent in the composite image.

In an embodiment, the imaging device further comprises an emitter that emits light toward the subject. In an embodiment, at each focal length, the imaging device captures a first image of the subject using a first lighting configuration of the emitter, and a second image of the subject using a second lighting configuration of the emitter that is different than the first lighting configuration.

In an embodiment, the controller generates the composite image based on the first images and the second images taken of the subject at the plurality of focal lengths. In an embodiment, the controller generates that composite image by generating a combined image for each focal length by blending the first image for a particular focal length with the second image of that focal length, generating a sharpness map for each combined image each sharpness map indicating a sharpness level for each pixel of its corresponding combined image, and generating the composite image by blending the combined images of each of the plurality of focal lengths together into a single image based on the sharpness levels in the sharpness maps.

In an embodiment, the emitter is a light ring with the plurality of light sources being disposed at different positions around the light ring. In an embodiment, the first image is a white reference image of the subject while white light from the emitter is incident on the subject as the first lighting configuration, and the second image is a color image of the subject while light of one or more colors from the emitter is incident on the subject as the second lighting configuration.

In an embodiment, the controller generates a normal map image for each focal length, indicating surface normals for surfaces of the subject, by comparing the white reference image of a particular focal length to the color image of that focal length. In an embodiment, the controller generates the combined image for each focal length by blending the normal map image for a particular focal length with the white reference image of that focal length, and generates the composite image by blending the combined images of the plurality of focal lengths together into a single image.

In an embodiment, a microscope is attached to the imaging device for imaging microscopic subjects.

In an embodiment, for each focal length, the imaging device captures a white reference image of the subject as the first image while white light from the emitter is incident on the subject as the first lighting configuration, a first color image of the subject as the second image while a red light, a green light, and a blue light are emitted from separate light sources of the light ring onto the subject as the second lighting configuration, and one or more additional color images taken of the subject while the red light, the green light, and the blue light are emitted from separate light sources of the light ring onto the subject from one or more positions that are different then in the first color image. In an embodiment, the controller generates a first normal map image for each focal length by comparing the white reference image of a particular focal length to the first color image of that focal length. In an embodiment, the controller generates a second normal map image for each focal length by comparing the white reference image of a particular focal length to the second color image of that focal length. In an embodiment, the controller generates a combined normal map image for each focal length by blending the first normal map image and the second normal map image of that focal length. In an embodiment, the controller generates the combined image for each focal length by blending the combined normal map image for a particular focal length with the white reference image of that focal length, and generates the composite image by blending the combined images of the plurality of focal lengths together into a single image.

In an embodiment, each of the red light, green light, and blue light are emitted from separate light sources of the light ring simultaneously. In an embodiment, each of the red light, green light, and blue light are emitted from separate light sources of the light ring at positions on the light ring that form a triangular shape. In an embodiment, for the first color image, the red light, green light, and blue light emitted from the light ring together form the triangular shape, and for the second color image, the red light, green light, and blue light emitted from the light ring are moved within the triangular shape such that two or more of the red light, green light, and blue light emit from a different position of the triangular shape than for the first color image. In an embodiment, the subject is airborne particulate matter collected for sampling and identification; and the composite image is analyzed by a detector and categorizer to determine the types and levels of particulate contained in the airborne particulate matter.

During imaging of the particulate matter by the imaging device, emitted light improves visibility and detail of the images captured by the imaging device and improves visibility of particulate matter captured in the image. The light emitted on to the collection surface and particulate matter may be light within a visible range of the electromagnetic spectrum or light within invisible ranges of the electromagnetic spectrum. The imaging device may be able to detect or capture light in both visible and invisible ranges of the electromagnetic spectrum. Taking one or more images of a subject using multiple focal lengths and lighting configurations increases the amount of details that may be discerned images of the subject. Combining said multiple pictures together provides significant details that cannot be captured in a single image. The use of the imaging device, microscope, and emitter allows for improved visibility and detail in captured images of particulate matter. Therefore, detection, analysis, and identification of particulate matter is also improved. In light of the foregoing, disclosed herein are multiple embodiments of imaging systems, devices, and methods for increasing detail and visibility of particulate matter, or other subjects and matter, in an image.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, devices, and methods for imaging, identification, and analysis of particulate matter are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

A detailed description of systems and methods consistent with embodiments of the disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail in order to avoid unnecessarily obscuring the disclosure.

As used herein, an emitter is a device that is capable of generating and emitting electromagnetic radiation. Various embodiments of emitters may be configured to emit electromagnetic radiation and may have very specific frequencies or ranges of frequencies from within the entire electromagnetic spectrum. Electromagnetic radiation may comprise wavelengths from the visible and non-visible ranges. An emitter may produce a steady stream of electromagnetic radiation or may be pulsed on and off to emit intermittent pulses of electromagnetic radiation. An emitter may be cycled on and off to produce a pulse or may produce a pulse with a shutter mechanism. An emitter may have variable power output levels or may be controlled with a secondary device such as an aperture or filter. An emitter may emit broad spectrum or full spectrum electromagnetic radiation that may produce pulses through color filtering or shuttering. An emitter may comprise a plurality of electromagnetic sources that act individually or in concert. An emitter may comprise an emitter module comprising one or more electromagnetic sources for pulsing electromagnetic radiation.

It should be noted that as used herein the term "light" is intended to denote electromagnetic radiation that may include wavelengths from the visible and non-visible spectrums of electromagnetic radiation. An emitter may be controlled digitally or through analog methods or systems. As used herein, an emitter is a source of electromagnetic radiation and includes light sources, such as lasers, LEDs, incandescent light, or any light source that can be digitally controlled.

As used herein, the terms "air" and "airborne" are not limited to breathable air or the common composition of the atmosphere. The terms "air" and "airborne" also include any gaseous medium, whether toxic or non-toxic, breathable or not, that may be tested for composition, concentration, or for particulate matter contained in the gaseous medium. Therefore, the terms "air" and "airborne" as used herein should not be seen as limiting and/or referring only to atmospheric air; the terms "air" and "airborne" may refer to any gaseous medium.

As used herein, the term "subject," such as a subject being imaged, is not limited to airborne particulate matter or dust, pollen, chemical particles, pollutants, and various other elements, particles, and/or compounds that may be organic, naturally-occurring, or synthetic. "Subject" may refer to any object or matter, no matter the size, that is to be imaged. Accordingly, the improved imaging devices, systems, methods, processes, and computer-based products described herein are useful to achieve more detailed imaging of any imagable subject whether visible or invisible to the human eye and no matter the size, including airborne particulate matter, waterborne particulate matter, particulate matter collected on a solid surface, and any matter in/on any medium. The disclosure is not limited to imaging airborne particulate matter.

Figure 1B:
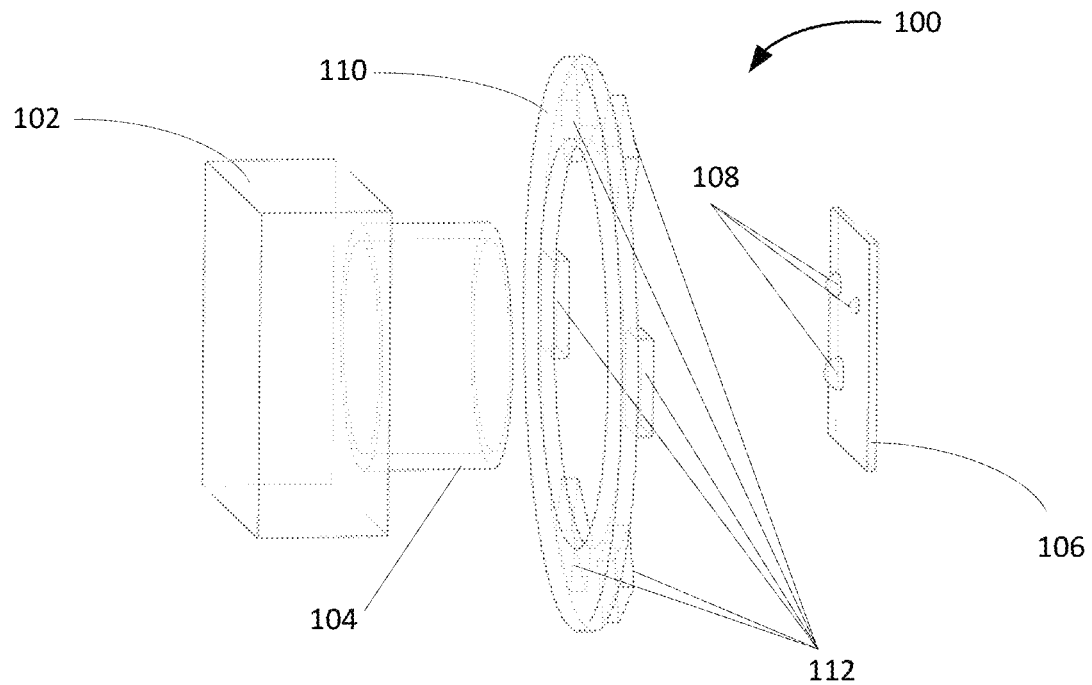
FIG. 1B illustrates an alternate view of the example imaging system of FIG. 1A according to according to one embodiment.

Turning to the figures, FIGS. 1A and 1B are illustrations of an imaging system 100 for imaging subjects such as particulate matter. Imaging system 100 may include camera 102, as an exemplary imaging device, which may be configured to capture images. Camera 102 may be an imaging device that is sensitive to electromagnetic radiation in both the visible and non-visible ranges of the electromagnetic spectrum. As shown in FIGS. 1A and 1B, an optical element 104 may be attached to camera 102 to adjust focus and/or focal lengths of camera 102 when imaging subjects. Optical element 104 may be a lens and/or a focus mechanism for adjusting focal lengths of camera 102. Imaging system 100 may further include a translation mechanism (not shown) that moves camera 102 and optical element 104 closer to subject(s) 108 or farther from subject(s) 108 to adjust the focal length of imaging system 100. Optical element 104 may further include a microscope including a lens and focus mechanism for imaging microscopic objects. Imaging system 100 may include a collection surface 106 where subject(s) 108 are gathered for imaging. Subject(s) 108 may include any form of matter suitable for imaging, including airborne particulate matter, waterborne particulate matter, and others.

Imaging system 100 may further include an emitter 110 disposed to emit onto collection surface 106 and subject(s) 108 being imaged by camera 102. Emitter 110 may be any suitable optical element for creating or directing light. For example, emitter 110 may be an electromagnetic radiation emitter or light source such as a light ring that emits light/electromagnetic radiation onto collection surface 106. Having a light ring or other optical element disposed around an optical aperture of camera 102 is advantageous in that it illuminates and directs light over a wide area of collection surface 106 and allows for a wide image of particulate matter to be analyzed and identified. The light source or emitter is not particularly limited and may be any emitter of light/electromagnetic radiation, whether visible or invisible, suitable to emit light onto a subject and surface.

Additionally, more than one light source or emitter may be used. For example, in one contemplated embodiment, imaging system 100 is configured to perform stereometric photography in which emitter 110 may be comprised of at least two light sources which may be independently powered. Emitter 110 may be configured as an array of light sources 112, that are powered simultaneously. Alternatively, each of light sources 112 may be independently powered in succession. The camera may simultaneously capture a succession of images, wherein the contrast in each image is determined by the light received by camera 102 from one of the light sources 112 being powered independently from the rest of the plurality of the light sources 112.

In one example, the emitter 110 is configured as a circular array of sixteen light sources such as light emitting diodes (LEDs). The light sources are not however, limited to just sixteen, but may be any number greater than one. Light sources 112 may each be capable of producing and emitting different color light or electromagnetic radiation at different times and in both the visible and non-visible ranges of the electromagnetic radiation spectrum. For example, each light source 112 may be able to produce and emit white light, red light, blue light, and green light at separate times.

Alternatively, each of light sources 112 may be configured to emit only one wavelength of light/electromagnetic radiation. For example, one of light sources 112 may be a red light source while others may be white, blue, and/or green light sources. In this case, emitter 110 may power white light sources at times when white light is desired, red light sources when red light is desired, blue light sources when blue light is desired, and/or green light sources when green light is desired for illuminating a subject(s) 108. Additionally, any combination of light/electromagnetic radiation wavelengths may be emitted simultaneously by simultaneously powering light sources associated with the desired wavelengths. Light sources 112, may be any form of light source such as lasers, LEDs, incandescent light, or any light source that can be controlled by digital and/or analog means.

Emitter 110 may alternatively be a reflector, prism, or diffuser that directs or reflects light coming from light sources positioned away from emitter 110 onto collection surface 106 and subject(s) 108.

In the embodiment shown in FIGS. 1A and 1B, emitter 110 is disposed between camera 102 and subject(s) 108. Emitter 110 emits or directs light onto a portion of collection surface 108 that faces imaging subsystem camera 102. Accordingly, the configuration shown in the drawings is a front-lit configuration. However, it is to be understood that a back-lit configuration, side-lit configuration, or combination of back, side, and front-lit configurations are also within the scope of the disclosure.

How the above-described imaging system 100 is used to image subject(s) 108 will now be described.

The process of imaging subject(s) 108 with imaging system 100 will be described with respect to FIGS. 2-15. The process of imaging subject(s) 108 may be divided into: 1) a pre-process that includes focal length/slice selection for imaging; 2) an imaging process that includes capturing a plurality of images of the subject(s) 108 using different lighting configurations and focal lengths; and 3) a post-imaging process that includes processing the captured images to generate a final composite image of subject(s) 108. Each part of the process will be described in turn below.

1. Pre-Process

The pre-process carried out before imaging the subject at certain focal lengths will be described with reference to FIGS. 2-6. In an embodiment, multiple images are captured of a subject at each of a plurality of focal lengths and blended into single images (called "slices" herein) using a plurality of different lighting configurations. However, prior to capturing the multiple images at each of a plurality of focal lengths, the optimum focal lengths for imaging are determined using focus scoring and focus finding carried out on images of various focal lengths.

Focus Scoring Pixels. Focus scoring is carried out on initial images of a subject at a plurality of focal lengths. Camera 102 captures multiple scoring images of subject(s) 108 as optical element 104 traverses through a plurality of focal lengths with each scoring image being taken at a different focal length. Each scoring image may be taken at low resolution to lessen processing, storage, and speed burdens. Each scoring image is first scored on per pixel basis. In other words, a focus score is calculated for each pixel. The focus score for a pixel indicates a level at which a particular pixel of the scoring image is "in focus."

Figure 2:
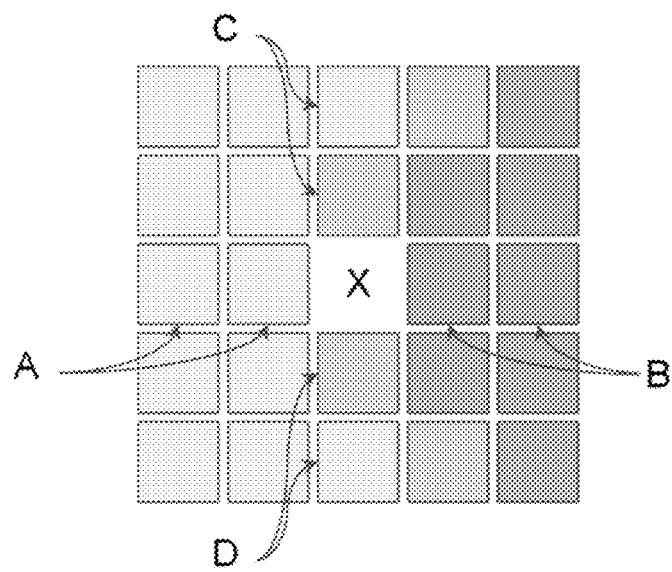
FIG. 2 illustrates an example of focus scoring of a pixel (x) and a number of pixels surrounding pixel (x).

An example for determining a focus score for each pixel is as follows. A particular pixel x, as shown in FIG. 2, may be compared to a number N of its neighboring pixels in one or more of vertical, horizontal, and diagonal directions. For example, pixel x in FIG. 2 is compared to multiple windows of neighboring pixels including left window A, right window B, top window C, and bottom window D.

FIG. 2 shows that windows A, B, C, and D include groups of two pixels where the groups neighbor pixel x. However, the number of neighboring pixels in a group is not particularly limited. For example, the neighboring pixels may be one pixel directly next to pixel x, a group of two pixels as shown in FIG. 2, or it may be a group of N pixels being more than two pixels in a direction away from the pixel x.

Differentials may be calculated between pixel x and each neighboring pixel or pixel group such as windows A, B, C, and D. As illustrated, differentials may be calculated in both horizontal and vertical directions. The differentials may be calculated by first calculating respective sums of pixel values for each of windows A, B, C, and D (i.e., SumA, SumB, SumC, SumD). A horizontal differential may be calculated by taking the absolute value of (SumA−SumB)^2, or raised to another exponential power. Similarly, a vertical differential may be calculated by taking the absolute value of (SumC−SumD)^2, or raised to another exponential power. The focus score for pixel x may then be the maximum or average of either the horizontal differential or the vertical differential. Respective equations for the above-described calculations are shown below:

$$SumA = \text{Sum of } N \text{ pixels to the left of pixel } x$$

$$SumB = \text{Sum of } N \text{ pixels to the right of pixel } x$$

$$SumC = \text{Sum of } N \text{ pixels above pixel } x$$

$$SumD = \text{Sum of } N \text{ pixels below pixel } x$$

$$HorizDiff = Abs(SumA - SumB)\char`\^ x$$

$$VertDiff = Abs(SumC - SumD)\char`\^ x$$

$$FocusScore(x) = Max(HorizDiff, VertDiff)$$

Focus Scoring Images. Once focus scores are calculated for each pixel in a scoring image, overall aggregate focus scores are determined for each scoring image. To determine the focus score for a particular scoring image, the focus scores for each pixel in that scoring image are added to a histogram where each bucket of the histogram represents a range of focus scores. The histogram then represents the volume of each level of sharpness of the scoring image. In other words, the histogram represents how many pixels in a particular scoring image have a particular sharpness level or fit within a particular range of sharpness levels.

Figure 3:
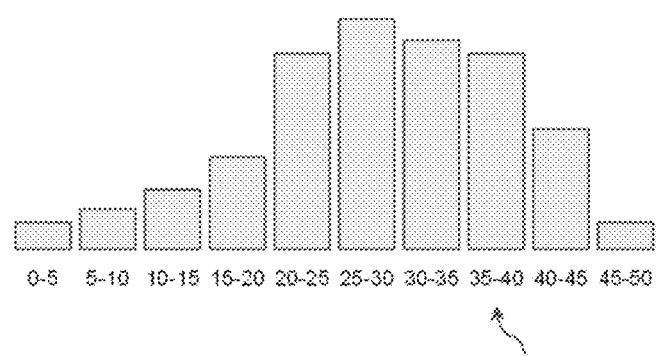
FIG. 3 illustrates a histogram of collected focus scores of pixels in a captured image.

A sample histogram 300 is shown in FIG. 3. As shown in histogram 300, most pixels for the particular scoring image of histogram 300 have focus scores within a range of 25-30. For purposes of this FIG. 3, the range 25-30 is merely an exemplary range of values and may not reflect actual values or ranges used. Additionally, the size of each range may vary depending on user desire or other circumstances.

Once a histogram is generated for a given scoring image, the data set represented in the histogram is processed using a k-means clustering algorithm with a user defined number k representing the number of clusters to be generated for each histogram. The k-means algorithm finds the specified number of clusters in the data set and returns mean values for each cluster. The center value or the mean value of the upper-most cluster returned by the k-means algorithm may then use as the scoring level for the scoring image. Alternatively, the score may be derived from the nth highest scoring cluster, the cluster containing the nth highest value, the inverse of a low scoring cluster, or another formula which utilizes one or more of the cluster values.

Focus scores for pixels are calculated for each scoring image taken at the various focal lengths. Once focus scores are calculated for pixels in each scoring image, focus scores are calculated for each of the scoring images taken at the various focal lengths based on the focus scores of the pixels.

Slice Selection For Imaging. With focus scores calculated for each scoring image, the focus scores for the scoring images may be analyzed to select a number of focal lengths to be used for subsequent, more-detailed imaging using different lighting configurations. The focal lengths selected for subsequent imaging may be referred to as "capture sites" or "selected focal lengths," where multiple images are captured to form a single combined image or slice.

FIGS. 4A-4F show sample scoring images taken of a subject at various focal lengths. Each image depicted in FIGS. 4A-4F are what may be scored and sampled to find peak focus scores for determining at what focal length slices will be generated. As shown in FIGS. 4A-4F, each of the images contain focus information for different areas of the subject being imaged. For example, in FIGS. 4B, 4C, and 5D, various areas subjects in the background are clearer than in FIGS. 4A, 4E, and 4F. However, grain 402 is more in focus in FIG. 4F than in the other images. Accordingly, a blended image containing the detail of all or some of FIGS. 4A-4F would be advantageous to show more detail of the subject being imaged.

Figure 5:
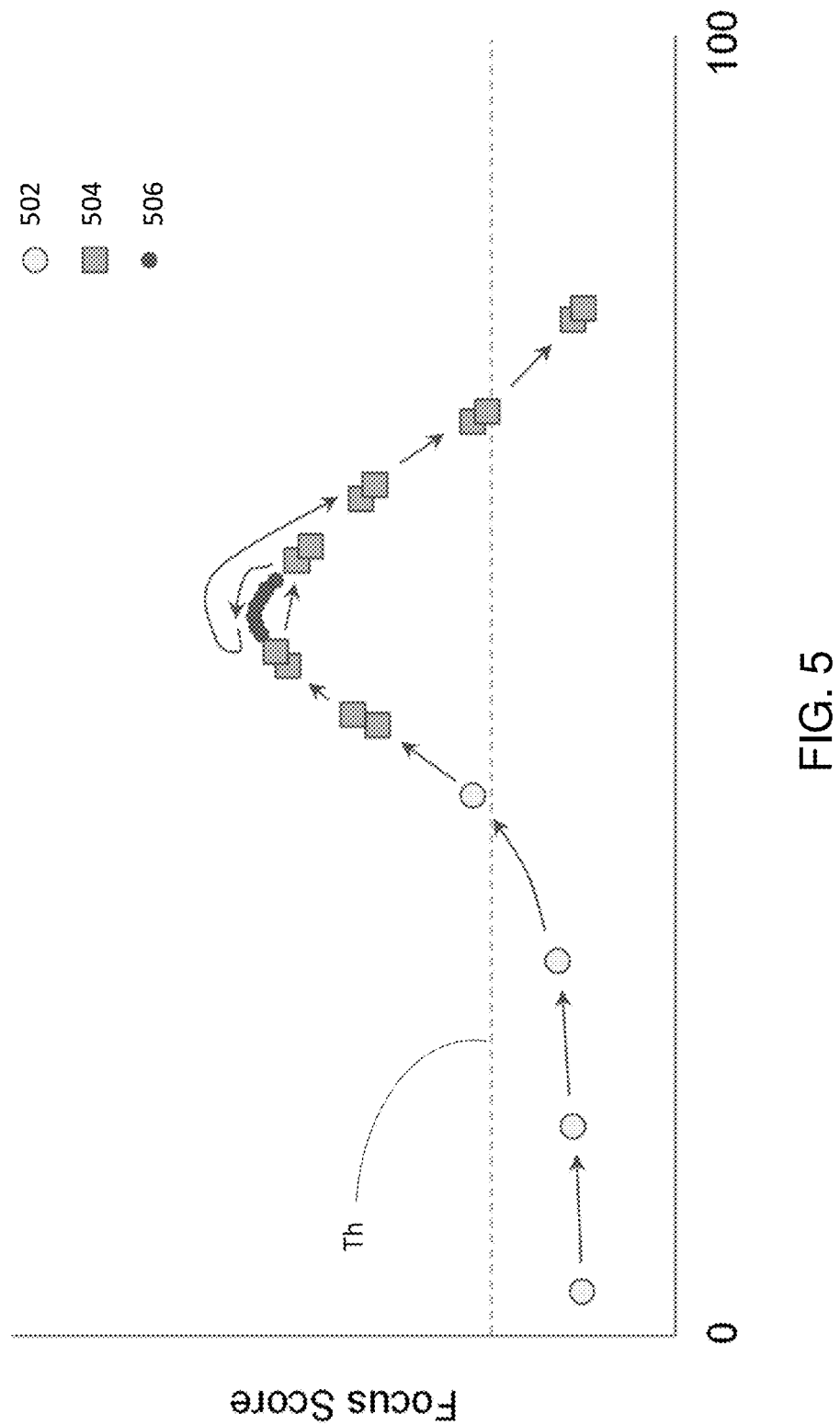
FIG. 5 illustrates an example focus finding diagram illustrating finding focused images in a plurality of captured images of a subject.
Figure 6:
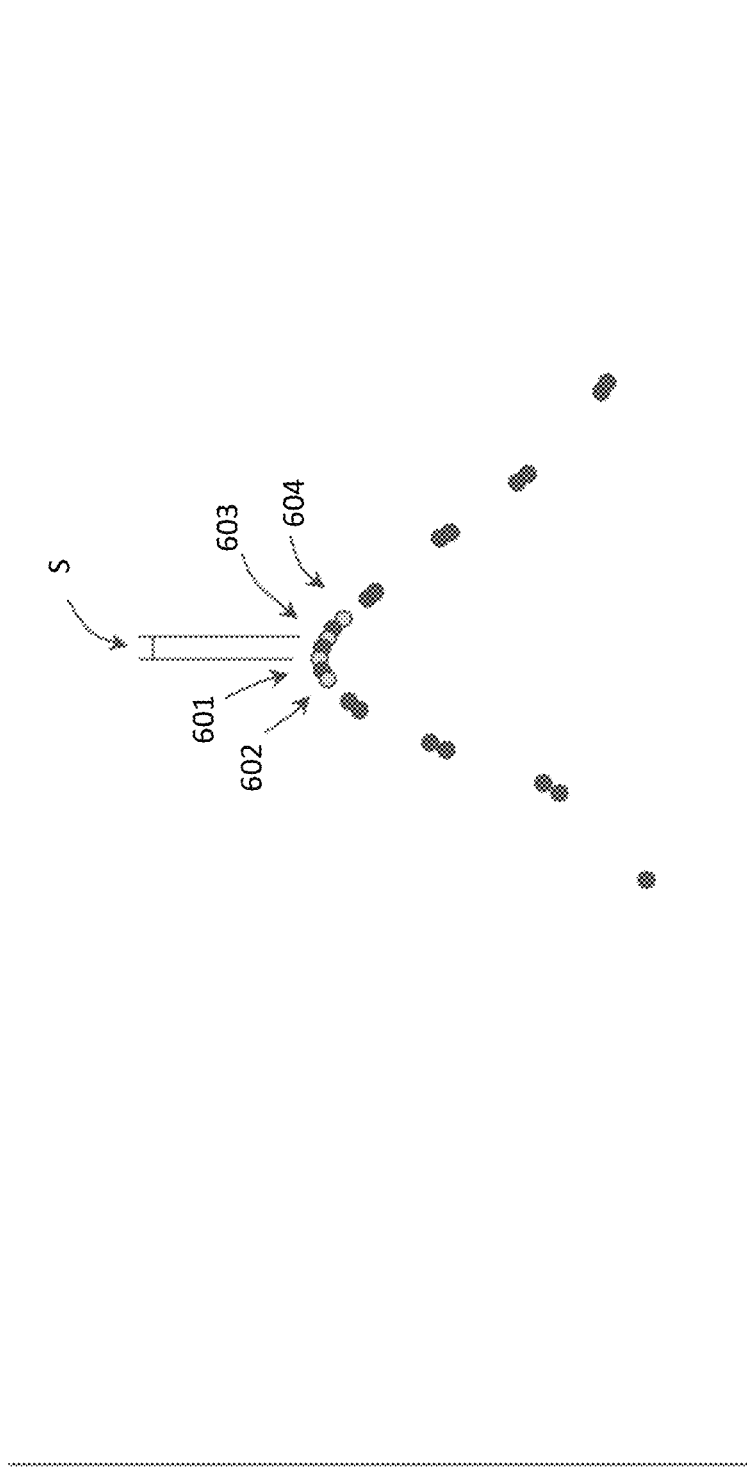
FIG. 6 is focal length/slice selection diagram illustrating focal length/slice selection for a combined image of an imaged subject.

Steps of a focus finding process for selecting slice focal lengths for imaging based on focus scores of scoring images are described with reference to FIGS. 5-6. As illustrated in FIG. 5, focus scores are shown on a graph and the focus finding process traverses through calculated focus scores for the plurality of focal lengths in one direction. Various speed modes and/or focus modes may be used to traverse the focus scores. For example, a rough focus mode (or fast mode) may be used that traverses the focus scores using a fast speed, relatively large spacing between focus scores, and a small number of focus scores sampled. Rough focus mode is depicted with indicator 502 in FIG. 5. The focus scores may be traversed using the rough focus mode until the focus scores being traversed are greater than or equal to a defined threshold value Th. When focus scores are greater than or equal to the threshold value Th, the focus finding process traverses the focus scores using a coarse focus mode (or slow mode).

In the coarse focus mode, (depicted with indicator 504 in FIG. 5), focus scores are sampled in one direction in neighboring pairs and are sampled at a speed slower than in the rough focus mode and with a smaller distance between sampled focus scores. Focus scores are sampled in pairs to detect the slope between the neighboring pairs. In other words, the focus scores are sampled in pairs to determine if the focus score between the pairs is increasing or decreasing as indicated by the slope between each focus score of the pair. When the rough focus mode detects adjacent sample pairs that switch from an upward slope to a downward slope, it is determined that a peak exists in between the adjacent sample pairs and the focus finding process switches to a fine focus mode (or peak mode).

In the fine focus mode, (depicted with indicator 506 in FIG. 5), focus scores between the adjacent sample pairs flanking the peak found in the coarse focus mode are sampled in tiny steps until the peak between the adjacent sample pairs is found. Note that a data set of focus scores for a plurality of focal lengths may contain multiple peaks. Accordingly, in the focus finding process, focus scores may be traversed to find multiple peaks or just one.

Once the focus scores have been traversed in the focus finding process, a slice selection may be carried out to select slices/focal lengths for subsequent imaging. For example, from the peak(s) found in the fine focus mode, focal lengths associated with the peak focus score(s) and a user-set number N of other focal lengths that are spaced a minimum focal distance S from the peak focus score(s) may be selected as focal lengths for slice generation. The user-set number N of selected focal lengths is chosen to be enough to gather enough sharpness information for a clear image. As shown in FIG. 6, focal length associated with focus score 601 is selected as a first focal length for slice generation.

Focal lengths associated with focus scores 602, 603, and 604, which are a minimum distance S from focus score 601 are also selected. The distance S and the number of N of focal lengths selected for slice generation are not particularly limited and may be chosen by a user to fit desired needs. While FIG. 6 shows four selected focal lengths for slice generation, two or more may be selected. Following selection of focal lengths associated with focus scores 601, 602, 603, and 604 as focal lengths for slice generation, the process of generating images for each slice is carried out.

2. Slice Generation Process

Imaging Process. The process carried out for imaging the subject at certain focal lengths will be described with reference to FIGS. 7-15. In an embodiment, multiple images are captured of a subject at each of a plurality of focal lengths using a plurality of different lighting configurations to generate slices. The process for imaging a subject at the selected focal lengths, which were selected as described above, will now be described.

Figure 7:
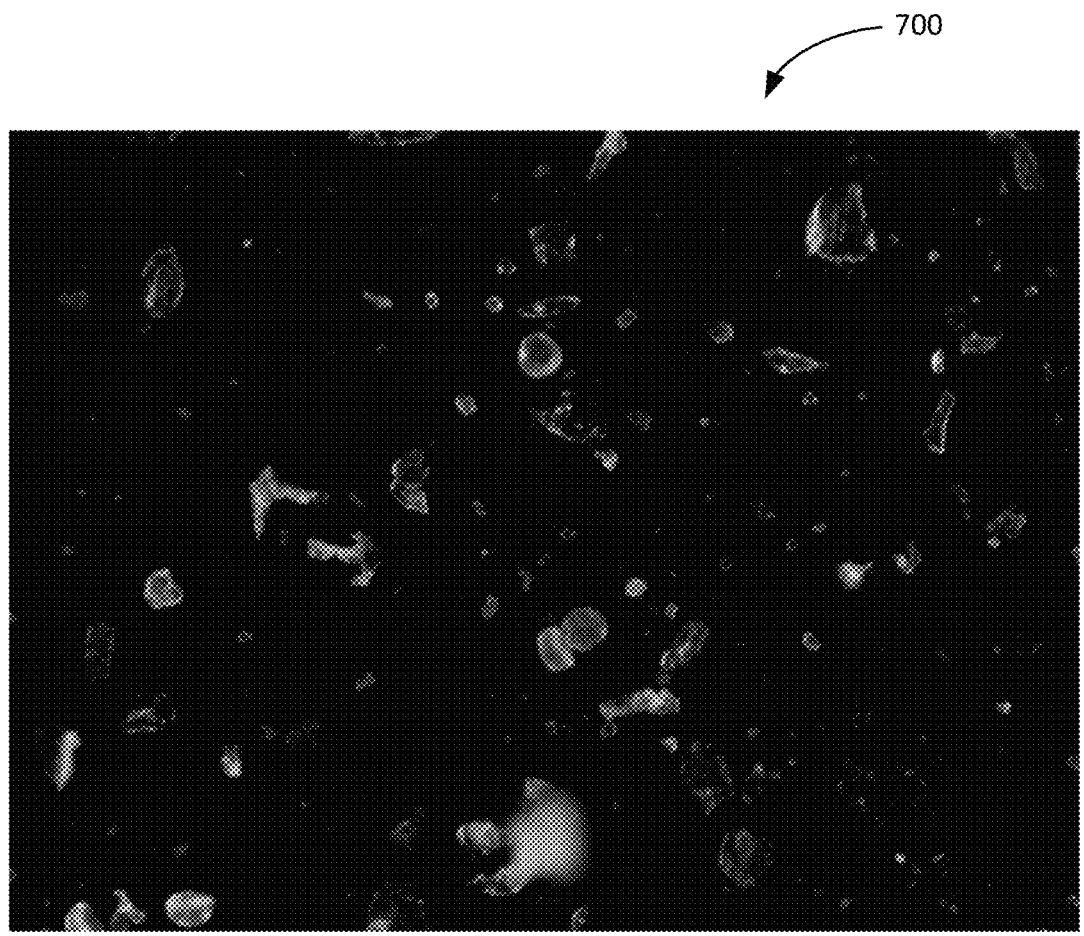
FIG. 7 illustrates a white light image of a subject taken at a particular focal length/slice captured using white light to illuminate the subject.

Once focal lengths for slice generation are selected, camera 102 and optical element may be moved into position to the selected focal lengths to image subject(s) 108 using multiple lighting configurations to generate multiple images of subject(s) 108 at each selected focal length. For a first image of the multiple images, subject(s) 108 may be illuminated by one or more light sources 112 on emitter 110. It is preferable to illuminate subject(s) 108 with multiple light sources 112 disposed at different angles relative to subject(s) 108 to adequately light subject(s) 108 from multiple angles. In this step, the one or more light sources 112 emit white light on to subject(s) 108 as a lighting configuration for illuminating subject(s) 108. Camera 102 captures an image of subject(s) 108 while the white light is incident on the subject and generates a white reference image of subject(s) 108, showing the true color of the subject(s) 108 and surface details of various pieces or parts of subject(s) 108. FIG. 7 shows white reference image 700 as an example of a white reference image.

Figure 8A:
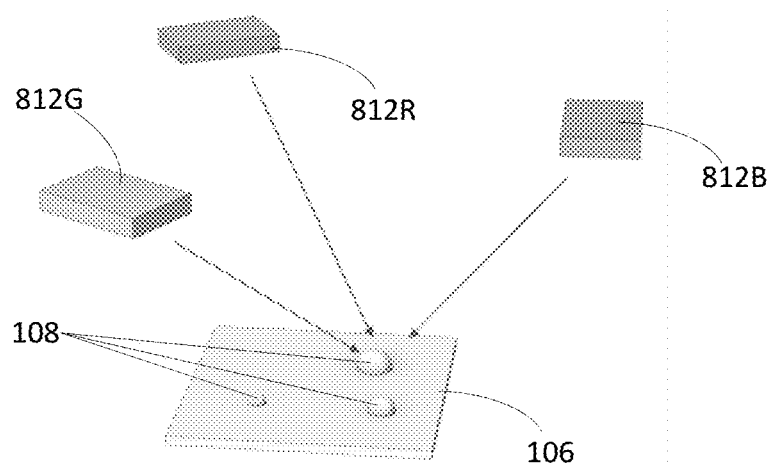
FIG. 8A is a representation of red, green, and blue lights illuminating a subject being imaged.

For a second image of the multiple images, subject(s) 108 may be illuminated by one or more light sources 112 on emitter 110. As shown in FIG. 8A, subject(s) 108 on collection surface 106 may be illuminated using another lighting configuration while capturing another image of subject(s) 108. For example, light sources 812R, 812B, and 812G may simultaneously illuminate subject(s) 108 during imaging by camera 102 to create a first color image of subject(s) 108. It is preferable to illuminate subject(s) 108 with multiple light sources 812R, 812B, and 812G oriented at different angles relative to subject(s) 108 to adequately light subject(s) 108 from multiple angles. In this step, light sources 812R, 812B, and 812G respectively emit red, blue, and green light on to subject(s) 108 as a lighting configuration for illuminating subject(s) 108.

Camera 102 captures an image of subject(s) 108 while the red, green, and blue lights are incident on the subject and generates a first color image of subject(s) 108. In this lighting configuration, the different lights illuminating subject(s) 108 from different angles results in an image where surfaces of subject(s) 108 are illuminated and colored differently based on which of light sources 812R, 812B, or 812G are directed towards that surface. In other words, a surface of subject(s) 108 that is oriented toward the blue light source 812B will have a blue color in the resulting image, a surface of subject(s) 108 that is oriented toward the red light source 812R will have a red color in the resulting image, and a surface of subject(s) 108 that is oriented toward the green light source 812G will have a green color in the resulting image. Accordingly, the first color image may be used to determine surface topography and orientation for subject(s) 108.

Figure 9B:
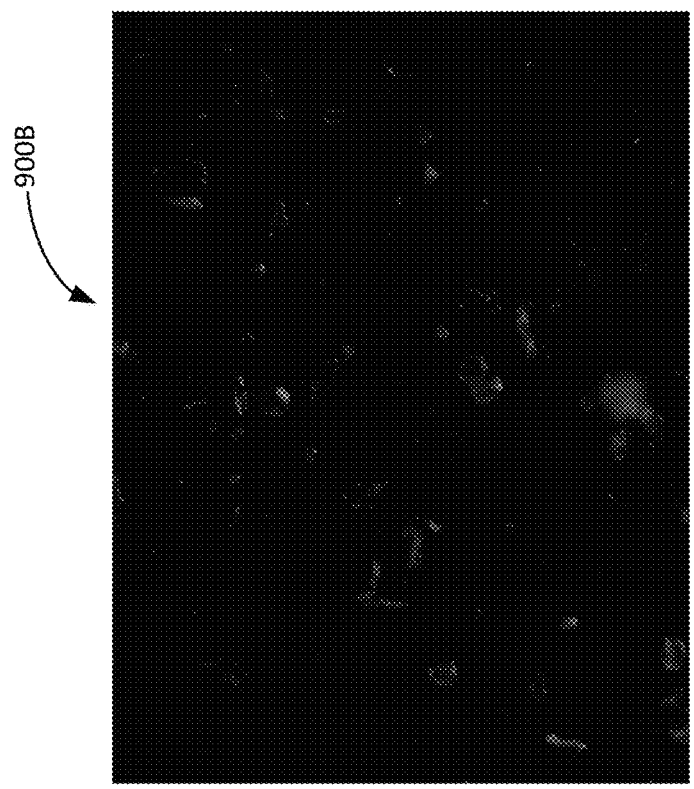
FIG. 9B illustrates a color light image of a subject taken at a particular focal length/slice and that is captured using red, green, and blue lights to illuminate the subject with the red, green, and blue lights being disposed at second positions different than the first positions.
Figure 9A:
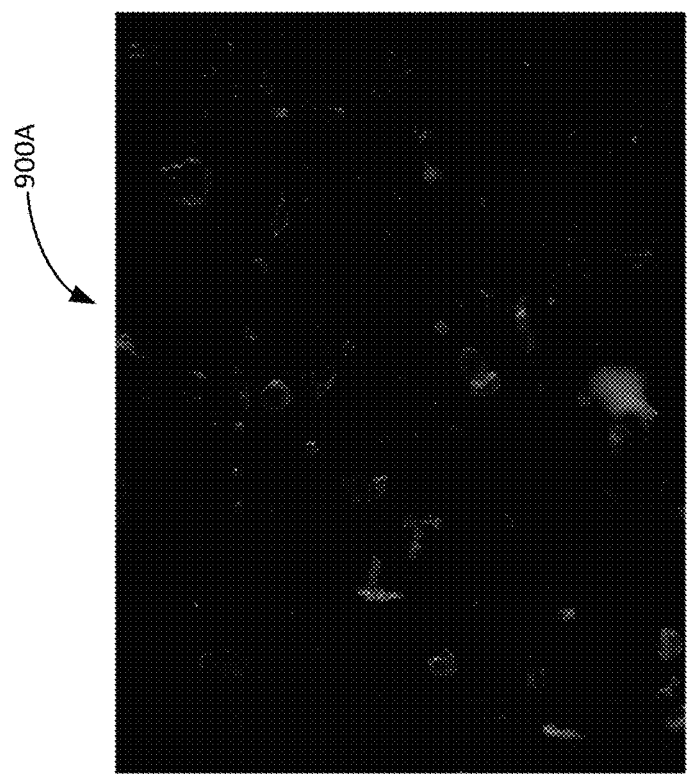
FIG. 9A illustrates a color light image of a subject taken at a particular focal length/slice and that is captured using red, green, and blue lights to illuminate the subject with the red, green, and blue lights being disposed at first positions.

FIG. 9A shows a black-and-white representation of first color image 900A as an example of a first color image. For example, the brightest spots in FIG. 9A correspond to spots which show a green color, thereby indicating that surfaces corresponding to the brightest spots are oriented toward a green light, while dimmer spots may be oriented toward a red or blue light. In a color image of FIG. 9A, red, green, and blue spots would be visible and it would be possible to discern what portions of particulate matter are oriented toward the respective color lights.

It is to be understood that a first color image may be generated without using all three color light sources 812R, 812B, and 812G. Color images may also be generated using either one, two, three, or more colored light sources and still achieve the advantages of the disclosure.

Figure 8B:
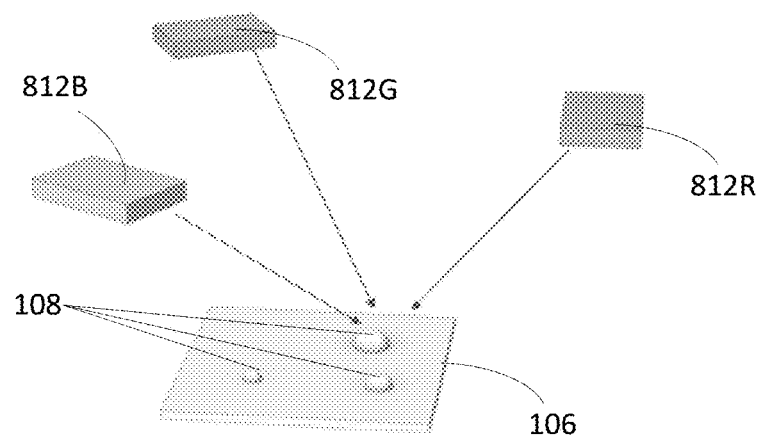
FIG. 8B is a representation of red, green, and blue lights illuminating a subject being imaged using a configuration and positioning of the red, green, and blue lights that is different from that used in FIG. 8A.

For a third image of the multiple images, subject(s) 108 may be illuminated by one or more light sources 112 on emitter 110. As shown in FIG. 8B, subject(s) 108 on collection surface 106 may be illuminated using another lighting configuration while capturing a second color image of subject(s) 108. For example, light sources 812R, 812B, and 812G may simultaneously illuminate subject(s) 108 during imaging by camera 102 to create a second color image of subject(s) 108, just as in FIG. 8A.

However, in this lighting configuration light sources 812R, 812B, and 812G are moved to new positions before imaging subject(s) 108. Or, rather, the light sources stay in the same position but emit different color light for the configuration shown in FIG. 8B. For example, the light source that emits red light in the configuration shown in FIG. 8A now emits green light in the configuration shown in FIG. 8B. The disclosure is not limited to this rotation of color light. For example, instead of using the same three light sources for both a first color image and second color image and making said light sources emit different color light for each color image, the emitter may use different light sources for the second color image than in the first color image.

Camera 102 captures an image of subject(s) 108 while the red, green, and blue lights are incident on the subject and generates a second color image of subject(s) 108. Like in the first color image, this lighting configuration of illuminating subject(s) 108 from different angles results in an image where surfaces of subject(s) 108 are illuminated and colored differently based on which of light sources 812R, 812B, or 812G are directed towards that surface. Due to the change in lighting configuration, the second color image highlights different detail and information for subject(s) surfaces than does the first color image. Accordingly, the second color image may be used to determine additional detail for surface topography and orientation for subject(s) 108.

FIG. 9B shows a black-and-white representation of second color image 900B, which is visibly different from color image 900A, as an example of a second color image. For example, the brightest spots in FIG. 9B are positioned differently then in FIG. 9A. The brightest spots in FIG. 9B also correspond to spots which show a green color, thereby indicating that surfaces corresponding to the brightest spots are oriented toward a green light, while dimmer spots may be oriented toward a red or blue light. In a color image of FIG. 9B, red, green, and blue spots would be visible and it would be possible to discern what portions of particulate matter are oriented toward the respective color lights. Due to the new position of green light in FIG. 9B compared to FIG. 9A, the bright spots (e.g., green spots) are positioned differently showing that new surfaces are now oriented toward the green light, or rather, the green light is oriented toward different surfaces in FIG. 9A then in FIG. 9B.

Figure 10:
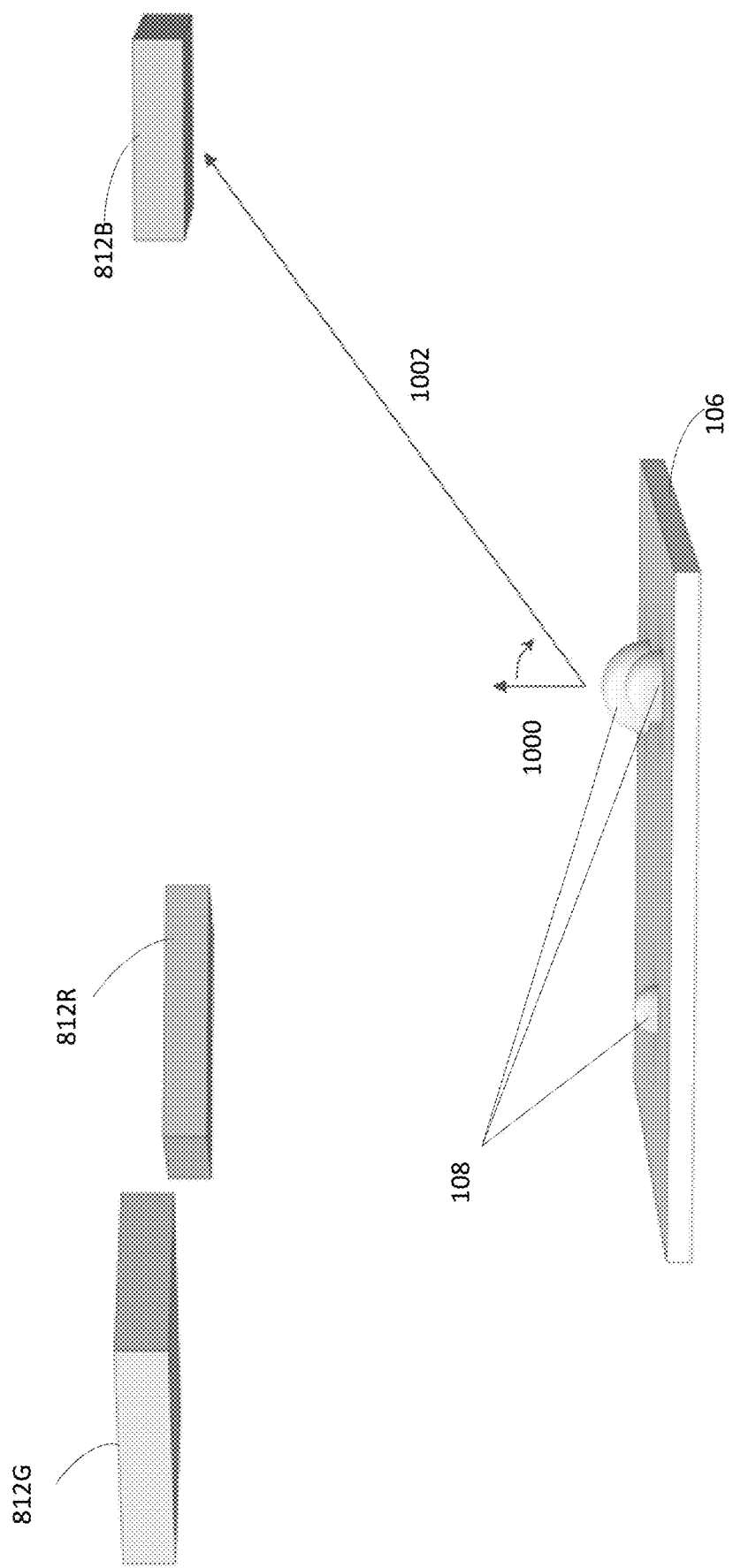
FIG. 10 is a representation of red, green, and blue lights illuminating a subject being imaged.

The first color image 900A and second color image 900B may be used to respectively create a first surface normal map and a second surface normal map, which indicate three-dimensional vectors indicating in which directions surface normals of the surfaces of subject(s) 108 are oriented. The first surface normal map and a second surface normal map may be generated by determining the red, green, and blue differentials/offsets of the white reference image when compared to the first and second color images factored against respective vectors pointing from subject(s) 108 to the respective light sources. An example of a surface normal 1000 from a surface of subject(s) 108 and a vector 1002 pointing from subject(s) 108 to the respective light source are illustrated in FIG. 10. The first surface normal map and second normal map may both be used to generate grayscale images of subject(s) 108 showing grayscale details of surfaces of subject(s) 108.

While this disclosure describes generating first and second surface normal maps, it is to be understood that the disclosure is not limited to two surface normal maps. One surface normal map may be used instead of two. Additional surface normal maps generated may be useful to reduce error and noise. Any number of surface normal maps, from 1 to n, may be generated. A user or a practitioner of the devices, systems, and/or methods described herein may select any desired number of surface normal maps to be generated.

Figure 11A:
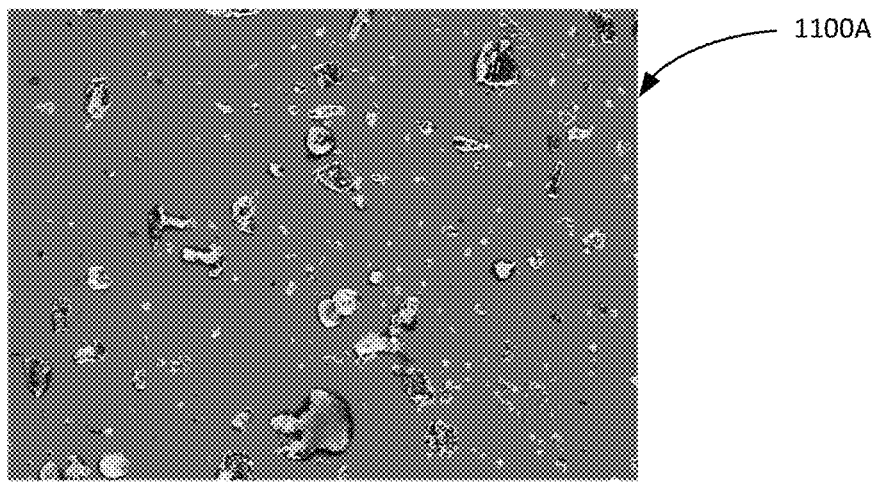
FIG. 11A is a representation of a greyscale image generated based on a normal map of the color light image in FIG. 9A.
Figure 11B:
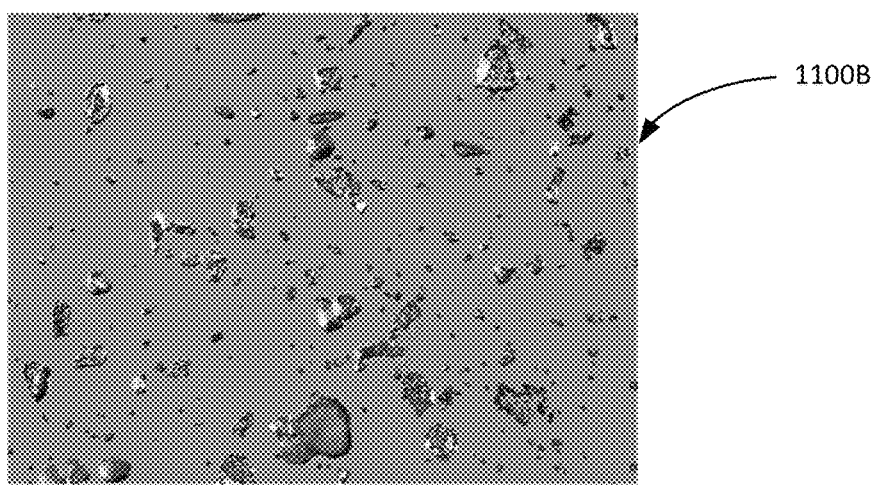
FIG. 11B is a representation of a greyscale image generated based on a normal map of the color light image in FIG. 9B.
Figure 11C:
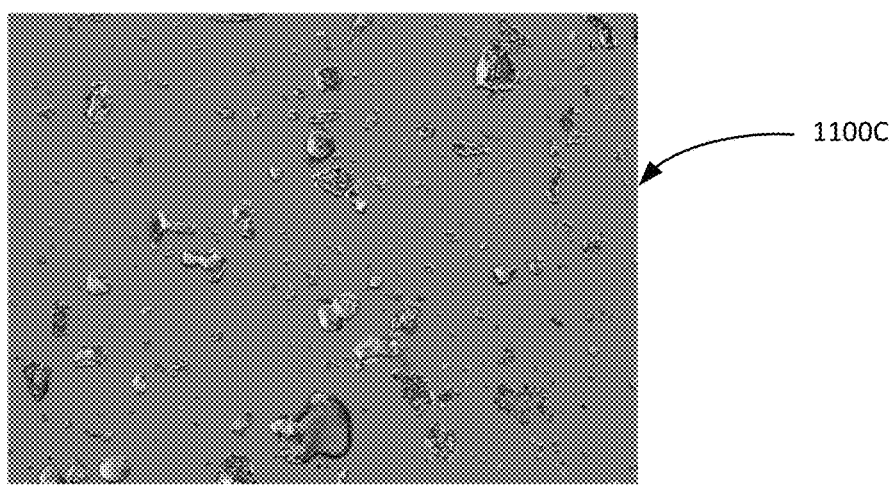
FIG. 11C is a representation of a blended image generated by combining the images of FIGS. 11A and 11B.
Figure 12:
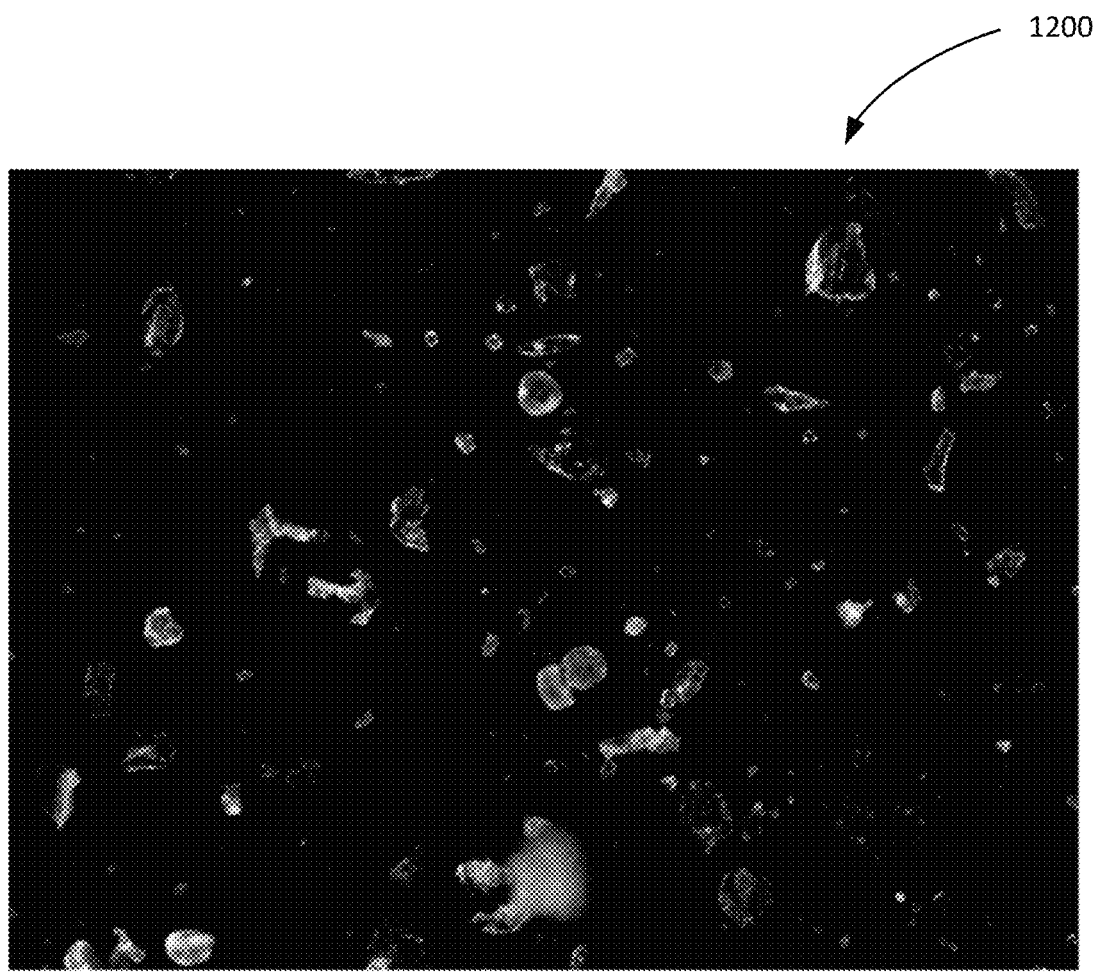
FIG. 12 is a representation of a blended image generated by combining the image of FIG. 7 with the image of FIG. 11C.

FIGS. 11A-11C illustrate examples of grayscale normal images generated from surface normal maps. First grayscale normal image 1100A is generated from first color image 900A and second grayscale normal image 1100B is generated from second color image 900B. First grayscale normal image 1100A and second grayscale image 1100B may be blended using image processing to generate a blended grayscale normal image. Blended grayscale normal image 1100C in FIG. 11C is an example blended grayscale normal image which was generated by blending first grayscale normal image 1100A and second grayscale normal image 1100B.

Once the above-described images have been captured and processed as described, blended grayscale normal image 1100C may be blended together with white reference image 700 to generate a slice image 1200 for a particular focal length. The resulting image represents both color information, as well as depth information regarding the subject(s) features. A plurality of slice images is created, at least one for each selected focal length that was selected for imaging in the above-described pre-process. All the plurality of slice images may then be blended together into a single final composite image (an example of which is shown as image 1500 in FIG. 15).

As an alternative to being used to create grayscale normal images, the generated normal map(s) may be used to generate a reconstruction of 3D surface topology of the subject being imaged. The reconstructed 3D surface topology may then be used for a plurality of purposes, including generating a single composite image from a plurality of slice images and/or generating a 3D model or a 3D surface heightmap. The 3D heightmap information from multiple slices may be used to generate the 3D model and may be viewed directly using a computer program, thus giving a user a 3D visual representation of the imaged subject(s).

Before, blending the plurality of slice images into a composite image, the images may undergo a process of sharpness mapping and weighted blending to improve the detail and image quality of the final composite image. This process of sharpness mapping and weighted blending will be described below.

2. Slice Blending Process

Sharpness Mapping. It is advantageous to blend the plurality of slice images into a composite image using sharpness mapping and weighted blending to ensure maximum detail in the final composite image. Because the plurality of slice images is taken at different focal lengths, some of the slices will have higher sharpness and detail in certain areas of the image than other slice images. For example, in FIGS. 4B, 4C, and 4D, various areas of subjects in the background are clearer than in FIGS. 4A, 4E, and 4F. However, grain 402 is more in focus in FIG. 4F than in the other images. Accordingly, slice images based on FIGS. 4B, 4C, and 4D should be weighted to be more prevalent in the background of the final composite image then similar areas of the other slice images. Similarly, the area containing grain 402 in FIG. 4F should be weighted to be more prevalent in the final composite image than other slice images so that grain 402 may be sharp and in focus in the final composite image.

Using sharpness mapping, a raw sharpness map may be generated for each of the generated slice images. This may be accomplished using the focus scores for each pixel calculated during the pre-process described above under the Focus Scoring Pixels section. Specifically, the discussion of FIGS. 2 and 3 above describe the process and calculations for determining focus scores for each pixel in the plurality of scoring images/slices. Raw sharpness maps for each slice may be generated using the focus scores of the pixels in each slice.

Figure 13A:
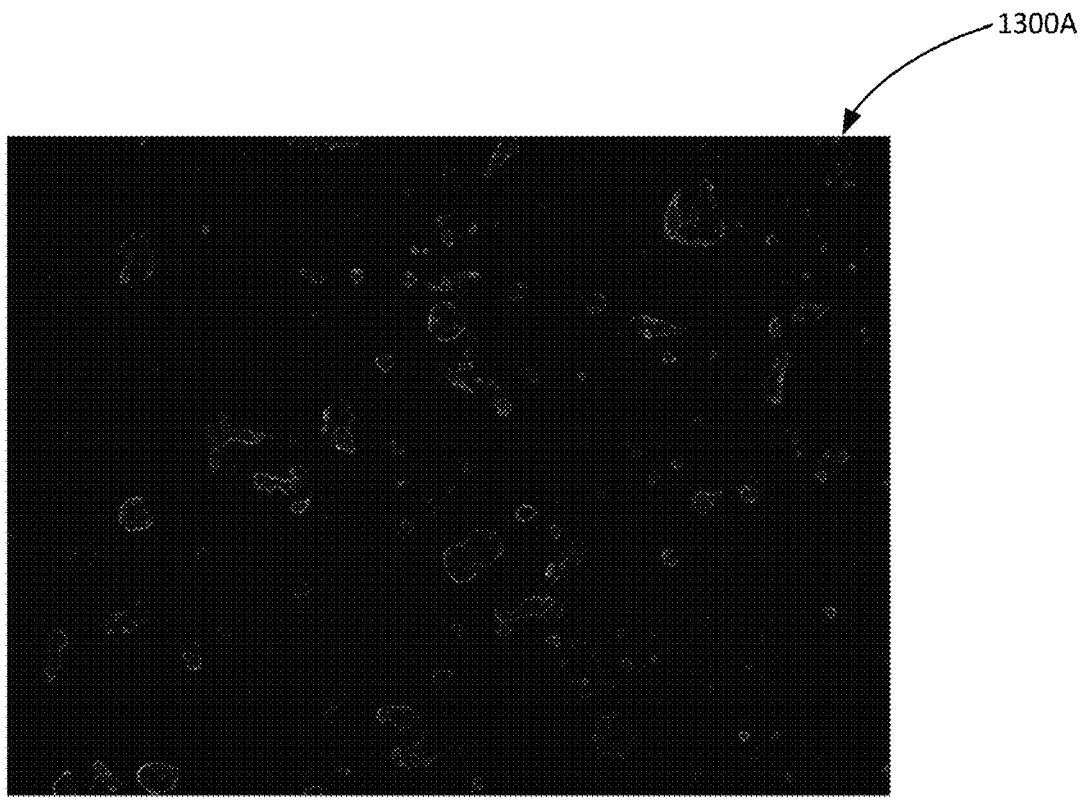
FIG. 13A is a representation of a raw sharpness mapping image of the captured subject taken at a particular focal length/slice.

An example raw sharpness map 1300A, which shows a map of the focus scores of each pixel in a single grayscale image, is shown in FIG. 13A. As seen in FIG. 13A, the areas of high sharpness (white portions of the image) are very small and confined to only one to a few pixels. As can be seen in FIG. 13A, some very small areas may have very high focus scores while the immediately surrounding area may have lower focus scores. This is shown where very bright white points are surrounded by darker areas.

Because of this disparity, blending the slice images based only on the raw sharpness map may leave out significant detail and useful sharpness information surrounding a particular pixel from the final composite image. For example, a first slice may have a very high focus score in a small area of a particular pixel, but may also contain useful sharpness information in an area immediately surrounding the particular pixel. In other words, the context surrounding an area of contrast/sharpness provides useful sharpness and image information and should be captured to provide a higher quality image of the subject. However, a second slice showing a blurrier image in the area of the particular pixel may have some pixels with higher sharpness scores in an area immediately surrounding that particular pixel than those same pixels in the first slice, causing the second slice to be weighted above the first slice. The area surrounding the particular pixel in the first slice, although some pixels in the area may have lower sharpness scores than the particular pixel, still contains useful sharpness information. Therefore, while some pixels surrounding the particular pixel in the first slice may have lower raw sharpness scores then those pixels in the second slice, it is beneficial to consider the sharpness information of the pixels in the area surrounding the particular pixel for weighting purposes to ensure that the best image of that area is shown in the final composite image.

This achieves an advantage of having better sharpness information being more prevalent in the final composite image so that the final composite image may have the most detail practicable. In other words, basing the final blending of slice images into the final composite image on raw sharpness data may result in a final composite image that has very small areas (only a few pixels) that are very sharp, but that are surrounded by large areas of blurry halos. For this reason, it is advantageous to expand and/or flare out areas of sharpness in the raw sharpness map to produce a map where larger areas of sharpness data can be considered for weighting slices in the final composite image.

Described another way, it is beneficial to include the context surrounding an area of high contrast (e.g. the brightness before an area becomes dark) when determining which sharpness information of an image to use. Out of focus aspects in an image are gradually blurred and flared out over a relatively wide area with low gradient contrast. Accordingly, blurry areas have blurry halos that have relatively low contrast over large areas. Therefore, for improving a final composite image, it is beneficial to expand the effect of sharp contrast across a wide area so as to supersede the slight/low contrast of blurry areas in blurry slices. Without expanding the effect of sharp contrast across a wide area, a final composite image shows an immediate sharp edge of a subject being imaged, but the sharp edge would be surrounded by a blurry halo because the low gradient contrast of the blur area scores higher in contrast to a flat black area in a background surrounding a subject.

The inventor has found that careful selection of parameters for expanding the effect of sharp contrast over a wide area overcomes the slight/low gradients of blurry slices. The parameters may be chosen to detect a very fast fall off to a slight contrast value going out a certain distance from each pixel (e.g., exponential fall-off). Such fast fall off values indicate an area where sharpness/contrast values may be expanded out.

Sharpness mapping for expanding and/or flaring out areas of sharpness in the raw sharpness map may be carried out as follows. Sharpness scoring may be carried out for each slice image generated at each of the plurality of focal lengths as described above, and/or each of the initial scoring images used for initial focus scoring of pixels. Each slice image is scored on per pixel basis. In other words, a sharpness score is calculated for each pixel. The sharpness score for a pixel indicates a sharpness level of that pixel.

An example for determining a sharpness score for each pixel is as follows. Similar to what has been described above, a particular pixel x, as shown in FIG. 2, may be compared to a number N of its neighboring pixels in one or more of vertical, horizontal, and diagonal directions. For example, pixel x in FIG. 2 is compared to multiple windows of neighboring pixels including left window A, right window B, top window C, and bottom window D.

FIG. 2 shows that windows A, B, C, and D include groups of two pixels where the groups neighbor pixel x. However, the number of neighboring pixels in a group is not particularly limited. For example, the neighboring pixels may be one pixel directly next to pixel x, a group of two pixels as shown in FIG. 2, or it may be a group of N pixels being more than two pixels in a direction away from the pixel x.

Differentials may be calculated between pixel x and each neighboring pixel or pixel group such as windows A, B, C, and D. As illustrated, differentials may be calculated in both horizontal and vertical directions. The differentials may be calculated by first calculating respective sums of pixel values for each of windows A, B, C, and D (i.e., SumA, SumB, SumC, SumD). A horizontal differential may be calculated by taking the absolute value of $(SumA-SumB)^6$, or raised to another exponential power. Similarly, a vertical differential may be calculated by taking the absolute value of $(SumC-SumD)^6$, or raised to another exponential power. The sharpness score for pixel x may then be the maximum of either the horizontal differential or the vertical differential. Respective equations for the above-described calculations are shown below:

$SumA$=Sum of $N$ pixels to the left of pixel $x$ $SumB$=Sum of $N$ pixels to the right of pixel $x$ $SumC$=Sum of $N$ pixels above pixel $x$ $SumD$=Sum of $N$ pixels below pixel $x$ $HorizDiff=Abs(SumA-SumB)^x$ $VertDiff=Abs(SumC-SumD)^x$ $SharpnessScore(x)=Max(HorizDiff, VertDiff)$ An example of a raw sharpness map 1300A created using similar calculations is shown in FIG. 13A. As described above, using raw sharpness for weighting the blending of slices may lead to a loss of useful sharpness information in the final composite image. For this reason, the raw sharpness map for each slice may be improved upon by generating flared sharpness maps for each slice where sharpness is not considered on a per-pixel basis. The raw sharpness map may be "flared out" (expanded) around pixels/areas of high sharpness to show sharpness information over larger areas of multiple pixels around the high sharpness pixels rather than just the highest sharpness pixels themselves in the sharpness map.

For example, a flared/expanded sharpness map is generated for each slice by taking using the raw sharpness map for each slice, comparing a particular high sharpness pixel to its surrounding/neighboring pixels, and logarithmically expanding the area around the particular pixel to a certain radius including surrounding pixels and to capture/enhance sharpness information around the particular pixel. The area around the particular pixel may be expanded to a certain user-selected or predetermined radius, or it may be expanded automatically up to a point where sharpness scores in pixels around the particular pixel reach a defined point of exponential fall off. For example, the expansion of an area around a particular pixel having high sharpness may be calculated using the following example algorithm:

Output[x,y]=Max(Input[i1 . . . i2, j1 . . . j2] neighboring pixels*exponential fall-off[i,j] mask). Where "i" is a particular pixel in the sharpness map.

In other words, the area for flared/expanded sharpness is calculated on a per-target-pixel basis. For each target pixel take a max value from the raw sharpness map within a radius r from the target pixel, where each pixel value is weighted based on a logarithmic fall-off.

Figure 13B:
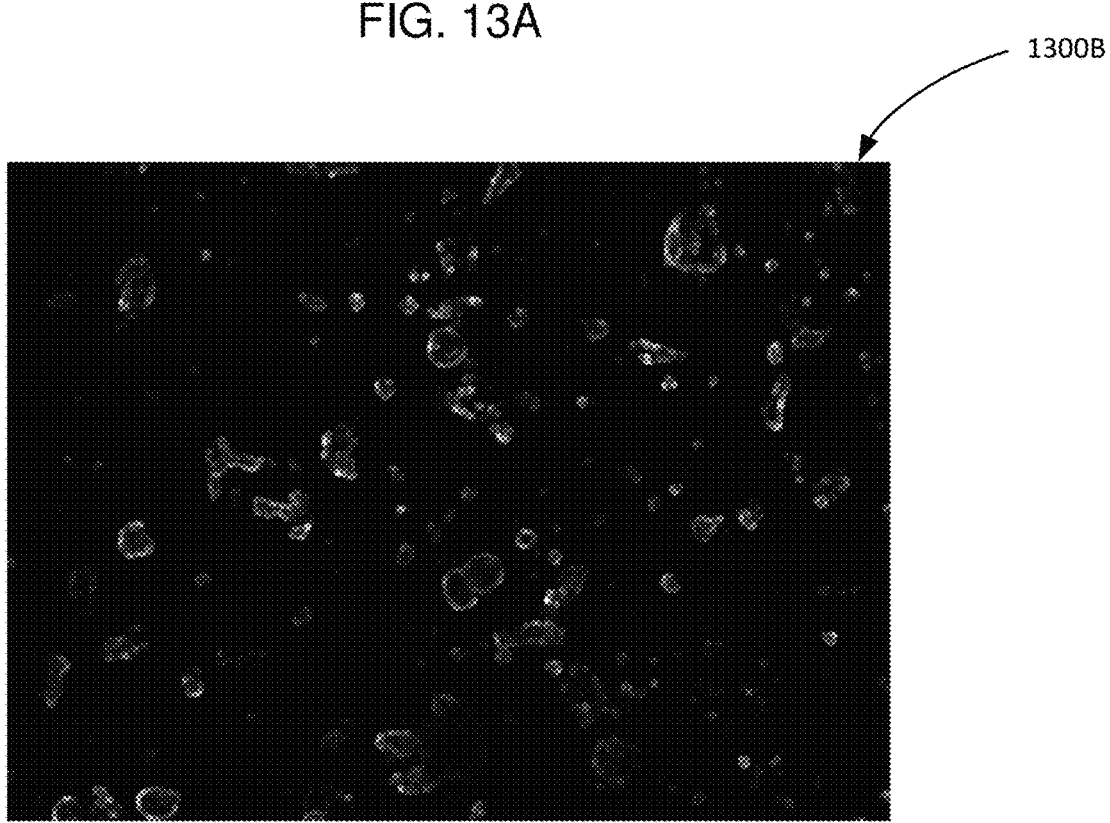
FIG. 13B is a representation of a sharpness mapping image with weighted blur expansion of the captured subject taken at a particular focal length/slice.

An example of a flared/expanded sharpness map 1300B of the raw sharpness map 1300A is shown in FIG. 13B. As shown in FIGS. 13A and 13B, flared/expanded sharpness map 1300B includes more sharpness information surrounding high-contrast areas and detail than does raw sharpness map 1300A. The expanded sharpness map areas extend out far more than is discernible with the naked eye allowing the large, low-power, expansions to overcome the contrast of blur from other slices/images.

Flaring out an area around pixels of high sharpness in the raw sharpness map accomplishes a better weighting of slice images when they are combined into a final composite image. In the final composite image, the entire area surrounding a sharp pixel in a first slice is weighted above and supersedes blurrier representations from other slices. In other words, the sharpness of the slice images is weighted by an area of multiple pixels instead of on a per-pixel basis.

Weighted Blending. Following the sharpness mapping, each of the generated slice images (such as slice image 1200 shown in FIG. 12) are combined into a single composite image. When each of the slice images are combined into the final composite image, the flared/expanded sharpness maps for each slice are used to determine which slices should be used for each area of the final composite image. In other words, if a particular multi-pixel area in a first slice has more sharpness information then a corresponding area in other slices, the multi-pixel area of the first slice would be weighted to be more prevalent and used in the final composite image rather than the corresponding area of the other slices.

Figure 4A:
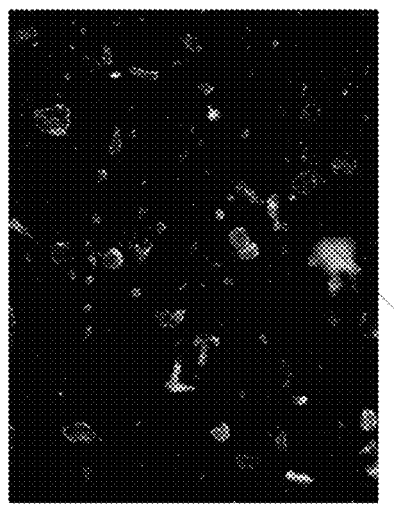
FIGS. 4A-4F illustrate various images of a subject at various focal lengths.
Figure 4C:
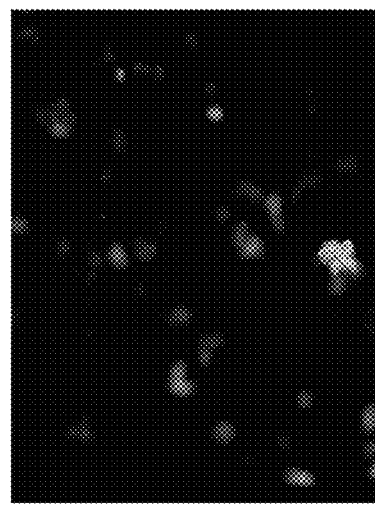
Figure 4B:
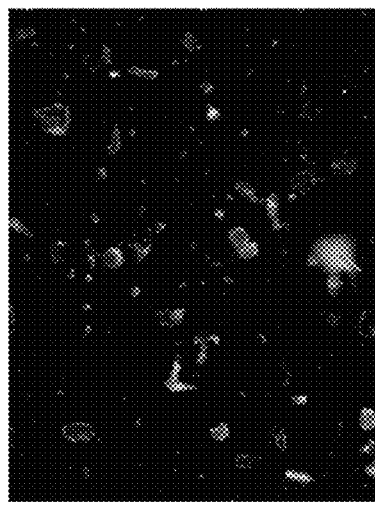
Figure 4E:
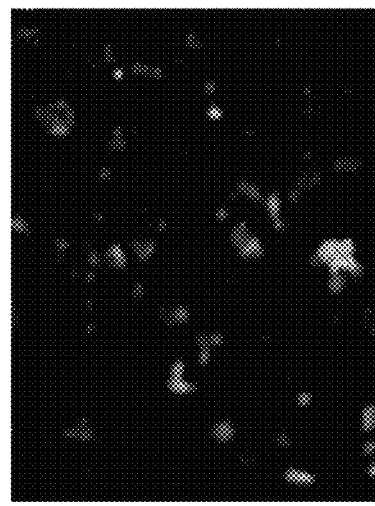
Figure 4D:
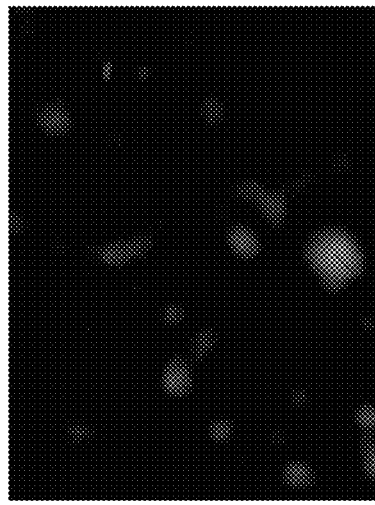
Figure 4F:
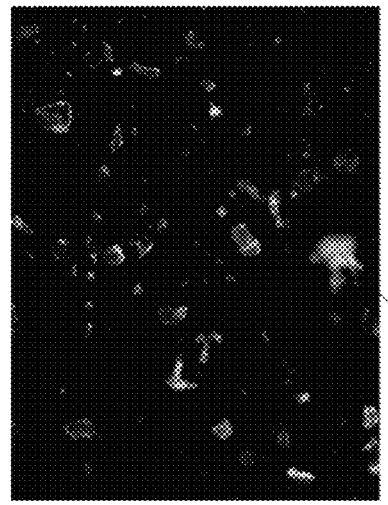

For example, FIGS. 4E and 4F show an image of grain 402 that is sharper than the images of grain 402 in FIGS. 4A-4D. Therefore, in the final composite image, the area corresponding to grain 402 would be used from FIGS. 4E and 4F (or a combination of the two) instead of the area corresponding to grain 402 in FIGS. 4A-4D.

To carry out the weighted blending, the flared/expanded sharpness maps (such as 1300B in FIG. 13B) are normalized on a per pixel basis by summing the sharpness maps of the slices together on a per pixel basis. The contribution towards the frame result for any given pixel is the slice image pixel value weighted against the ratio of that slice's expanded sharpness map to the sum of all slice's sharpness maps. This normalizes the total contribution from all slices so that the total weighting factor is one and thus the result pixel is derived from the slice pixels with neither brightening nor dimming. For example, the following algorithm may be used:

$$\text{Output}[x,y] = \text{slice}[s][x,y] * (\text{sharpness}[s][x,y]/\text{sum}[x,y])$$

Figure 14:
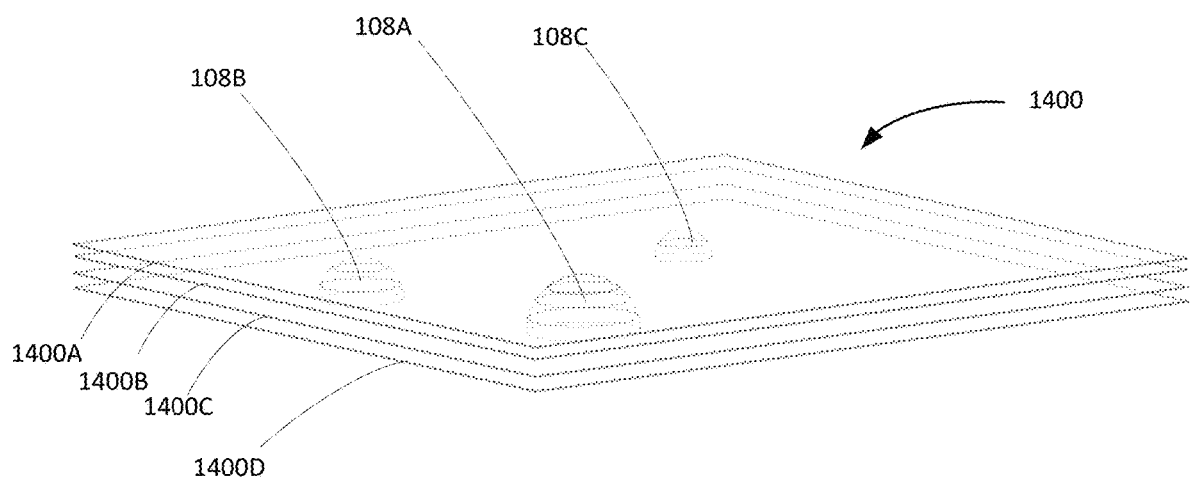
FIG. 14 is an illustration of blending of multiple images taken at different focal lengths/slices.
Figure 15:
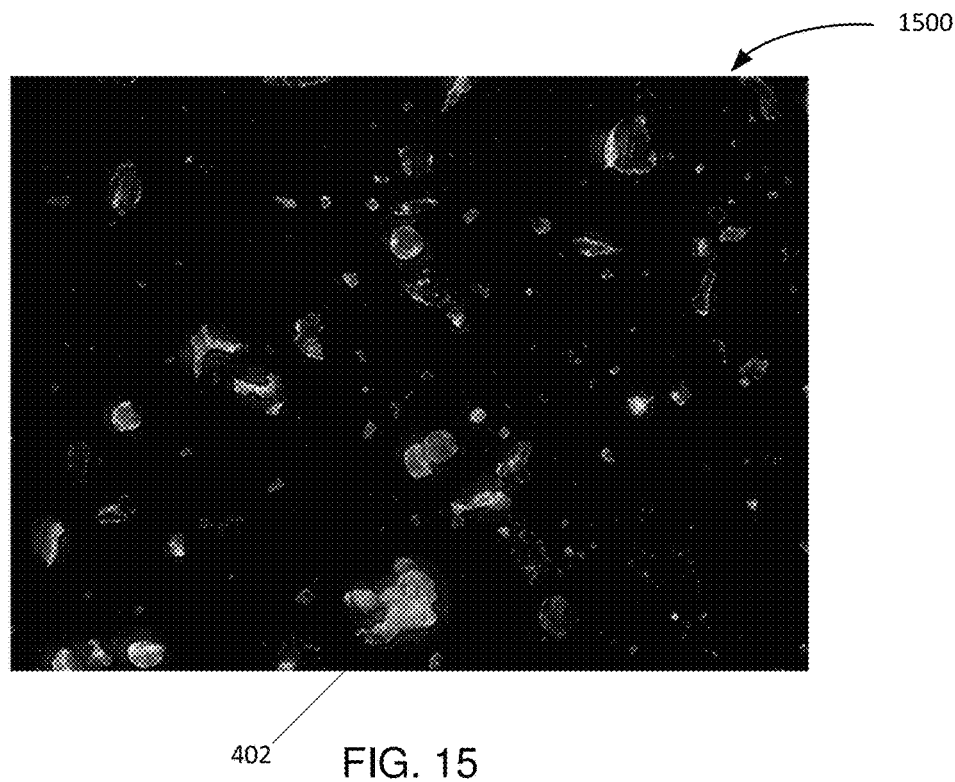
FIG. 15 is a representation of a blended image generated by combining the images of multiple different focal lengths/slices.

Following weighted blending, the slice images are combined into a final composite image with areas selected from each slice to be more prevalent in the final composite image based on the result of the weighted blending. FIG. 14 shows a representation 1400 of multiple slice images 1400A-1400D being weighted and combined into the final composite image 1500 shown in FIG. 15. For example, subject 108A may be shown in the final composite image predominantly based on image information from slice 1400A, subject 108B may be shown in the final composite image predominantly based on image information from slice 1400B, and subject 108C may be shown in the final composite image predominantly based on image information from slice 1400C. Furthermore, any combination of slices 1400A-1400D may be used to produce the final composite image of one of the subjects 108A-108C in the final composite image 1500.

Combining the slice images using one or more of the processes described herein results in a final composite image 1500 that shows all of subjects 108 in improved detail and clarity. FIGS. 4A-4F show that certain areas of each image are in focus while other areas are blurry. However, in the final composite image 1500, each grain and particulate of the subjects being imaged is in focus based on the combination of the sharp image data from all the slice images. Accordingly grain 402 in image 1500 is in focus at the same time as the other background matter.

Once the final composite image 1500 is generated, final composite image 1500 may be stored for reference, aesthetic, comparison, and/or other purposes, and/or analyzed by one or more detectors, categorizers, and/or software programs to analyze the subjects and matter contained in image 1500. For example, if the subjects being imaged are collected airborne particulate matter, image 1500 may be analyzed by one or more detectors, categorizers, and/or software programs to identify the types, composition, and concentration of airborne particulate matter collected. Imaging system 100 of FIG. 1 may include a controller and/or processor for carrying out the steps and analysis contained herein.

Alternatively, imaging system 100 may include a transmitter/receiver to send data via internet, wired, or wireless connections to an outside computing device for data analysis and storage. An imaging system 100 may include an outside computing system/controller to analyze the data gathered by imaging system 100. Whether the data analysis and particulate identification is carried out in a controller in imaging system 100 or an outside computer, either may include one or more of the components described below and shown in FIG. 16.

Figure 16:
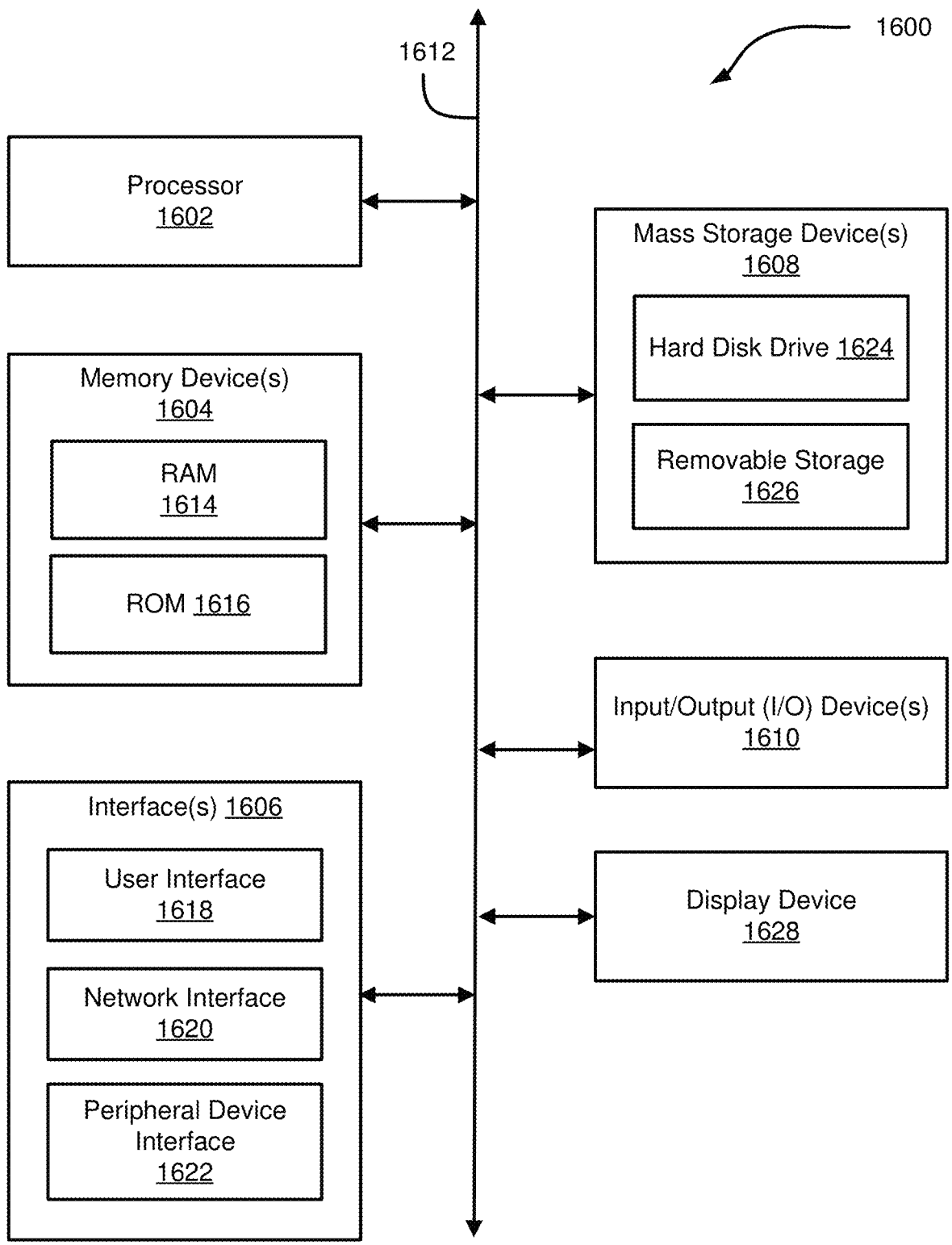
FIG. 16 is a block diagram of an example computing device in accordance with the teachings and principles of the disclosure.

FIG. 16 is a schematic diagram of complementary system hardware such as a special purpose or general-purpose computer. Either a controller of imaging device 100 or an outside computer may perform the function of a special purpose or general-purpose computer. Implementations within the scope of the disclosure may also include physical and other non-transitory computer readable media for carrying or storing computer executable instructions and/or data structures. Such computer readable media can be any available media that can be accessed by a general purpose or special purpose computer system. Computer readable media that stores computer executable instructions are computer storage media (devices). Computer readable media that carry computer executable instructions are transmission media. Thus, by way of example, and not limitation, implementations of the disclosure can comprise at least two distinctly different kinds of computer readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer executable instructions or data structures and which can be accessed by a general purpose or special purpose computer.

A "network" is defined as one or more data links that enable the transport of electronic data between computer systems and/or modules and/or other electronic devices. In an implementation, a sensor and camera controller may be networked to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer executable instructions or data structures and which can be accessed by a general purpose or special purpose computer. Combinations of the above should also be included within the scope of computer readable media.

Further, upon reaching various computer system components, program code means in the form of computer executable instructions or data structures that can be transferred automatically from transmission media to computer storage media (devices) (or vice versa). For example, computer executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer executable instructions comprise, for example, instructions and data which, when executed by one or more processors, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, controllers, camera controllers, handheld devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above-mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 16 is a block diagram illustrating an example computing device 1600. Computing device 1600 may be used to perform various procedures, such as those discussed herein. Computing device 1600 can function as a server, a client, or any other computing entity. Computing device 1600 can perform various monitoring functions as discussed herein, and can execute one or more application programs, such as the application programs described herein. Computing device 1600 can be any of a wide variety of computing devices, such as a desktop computer, a notebook computer, a server computer, a handheld computer, camera controller, tablet computer and the like.

Computing device 1600 includes one or more processor(s) 1602, one or more memory device(s) 1604, one or more interface(s) 1606, one or more mass storage device(s) 1608, one or more Input/Output (I/O) device(s) 1610, and a display device 1628 all of which are coupled to a bus 1612. Processor(s) 1602 include one or more processors or controllers that execute instructions stored in memory device(s) 1604 and/or mass storage device(s) 1608. Processor(s) 1602 may also include various types of computer readable media, such as cache memory.

Memory device(s) 1604 include various computer readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 1628 includes any type of device capable of displaying information to one or more users of computing device 1600. Examples of display device 1628 include a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, etc.), keyboards, and the like.

Bus 1612 allows processor(s) 1602, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1600 and are executed by processor(s) 1602. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Methods described herein will be discussed with reference to FIGS. 17-19. Each method described herein may include more or fewer steps then described and/or illustrated. A method for capturing images of a subject is illustrated in FIG. 17. The method may include the following steps. Capturing a plurality of images of the subject at a plurality of focal lengths, wherein, at each focal length, the imaging device captures a first image of the subject using a first lighting configuration and a second image of the subject using a second lighting configuration that is different than the first lighting configuration is shown as step 1702 of the method. Generating a combined image for each focal length by blending the first image for a particular focal length with the second image of that focal length is shown as step 1704 of the method. Generating a composite image by blending the combined images of each of the plurality of focal lengths together into a single image is shown as step 1706 of the method.

Figure 18:
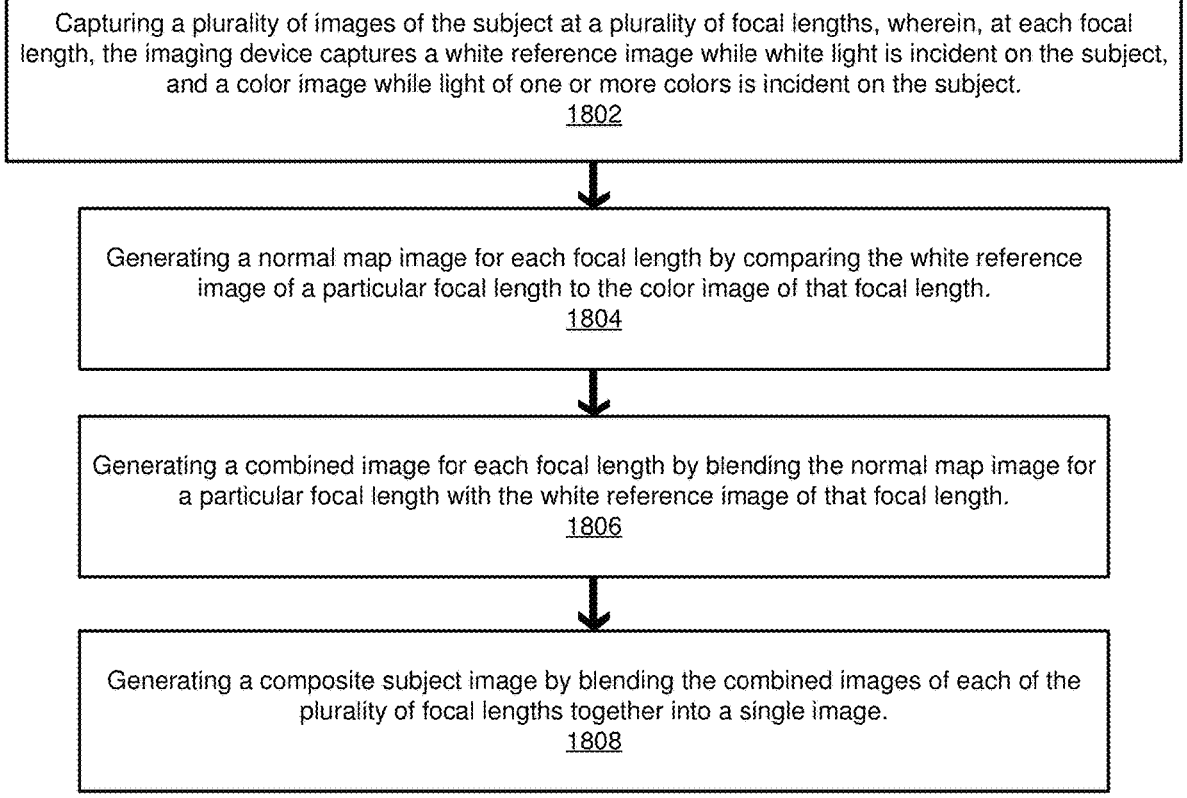
FIG. 18 is a block diagram illustrating a method for imaging a subject as described herein.

A method for capturing images of a subject is illustrated in FIG. 18. The method may include the following steps. Capturing a plurality of images of the subject at a plurality of focal lengths, wherein, at each focal length, the imaging device captures a white reference image while white light is incident on the subject, and a color image while light of one or more colors is incident on the subject is shown as step 1802 of the method. Generating a normal map image for each focal length by comparing the white reference image of a particular focal length to the color image of that focal length is shown as step 1804 of the method. Generating a combined image for each focal length by blending the normal map image for a particular focal length with the white reference image of that focal length is shown as step 1806 of the method. Generating a composite image by blending the combined images of each of the plurality of focal lengths together into a single image is shown as step 1808 of the method.

Figure 19:
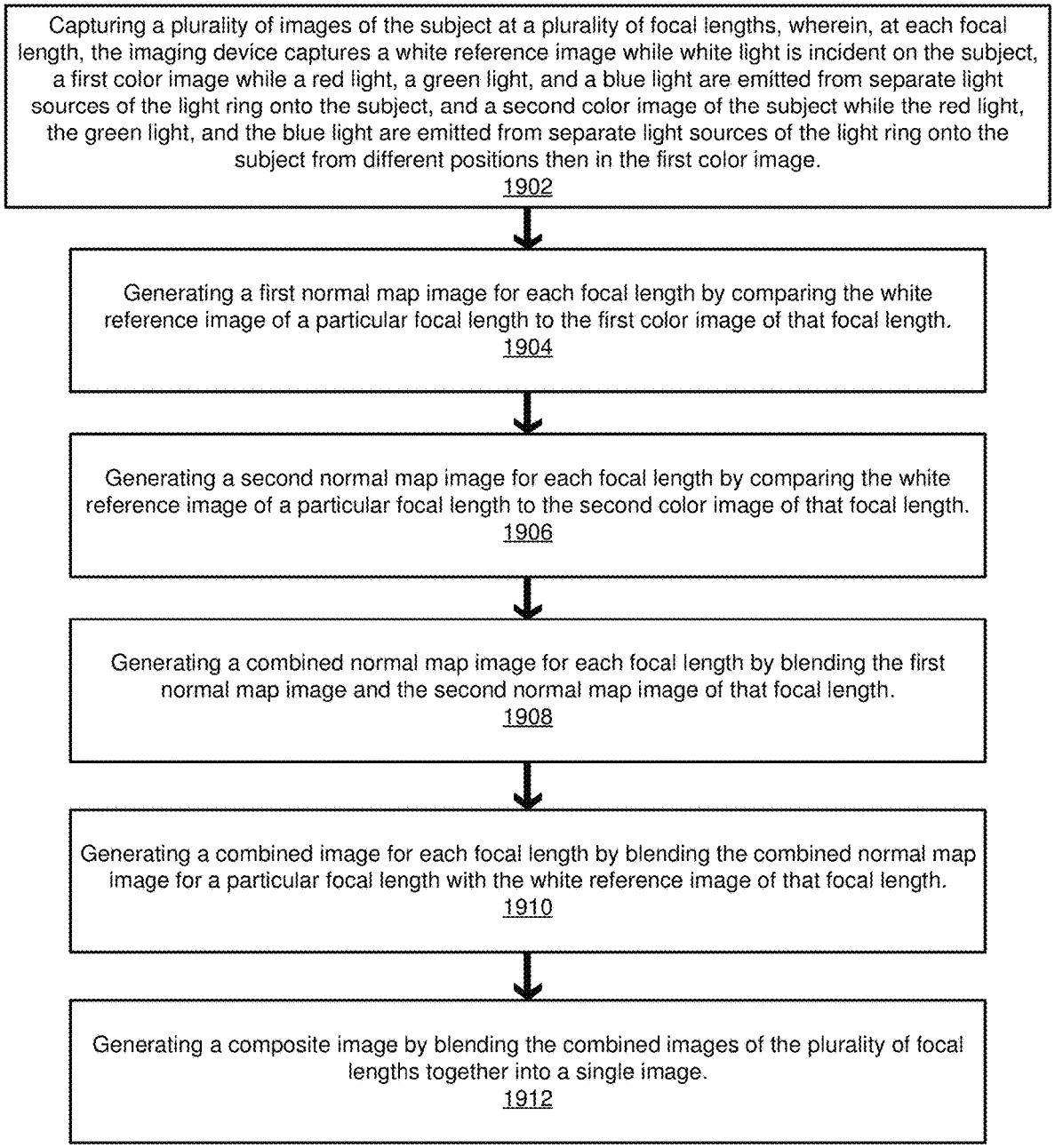
FIG. 19 is a block diagram illustrating a method for imaging a subject as described herein.

A method for capturing images of a subject is illustrated in FIG. 19. The method may include the following steps. Capturing a plurality of images of the subject at a plurality of focal lengths, wherein, at each focal length, the imaging device captures a white reference image while white light is incident on the subject, a first color image while a red light, a green light, and a blue light are emitted from separate light sources of the light ring onto the subject, and a second color image of the subject while the red light, the green light, and the blue light are emitted from separate light sources of the light ring onto the subject from different positions then in the first color image is shown as step 1902 of the method. Generating a first normal map image for each focal length by comparing the white reference image of a particular focal length to the first color image of that focal length is shown as step 1904 of the method. Generating a second normal map image for each focal length by comparing the white reference image of a particular focal length to the second color image of that focal length is shown as step 1906 of the method. Generating a combined normal map image for each focal length by blending the first normal map image and the second normal map image of that focal length is shown as step 1908 of the method. Generating a combined image for each focal length by blending the combined normal map image for a particular focal length with the white reference image of that focal length is shown as step 1910 of the method. Generating a composite image by blending the combined images of the plurality of focal lengths together into a single image is shown as step 1912 of the method.

EXAMPLES

The following examples pertain to further embodiments.

Example 1 is an imaging system for capturing an image of a subject comprising an imaging device that captures images of the subject, a focus mechanism for changing a focal length of the imaging device, and a controller that processes images captured by the imaging device. The imaging device captures one or more images of the subject at each of a plurality of focal lengths. The controller generates a sharpness map for each of the one or more images of the subject at each of the plurality of focal lengths. The controller generates a composite image of the subject by blending together the one or more images at each of the plurality of focal lengths into a single image based on the sharpness maps.

Example 2 is the imaging system as in Example 1, wherein each sharpness map indicates a sharpness level for each pixel of its corresponding image of the one or more images of the subject at each of the plurality of focal lengths. The blending together the one or more images of the subject at each of the plurality of focal lengths into a single image is based on the sharpness levels in the sharpness maps.

Example 3 is the imaging system as in Examples 1-2, wherein the controller generates each sharpness map by determining a sharpness level for each pixel in a particular image of the one or more images of the subject at each of the plurality of focal lengths, generating a raw sharpness map for the particular image of the one or more images of the subject at each of the plurality of focal lengths based on the sharpness levels determined for each pixel, and generating an expanded sharpness map based on the raw sharpness map by creating expanded areas around high sharpness pixels in the raw sharpness map to a size including additional sharpness information surrounding the high sharpness pixels. The controller generates the composite image of the subject by blending together the one or more images of the subject at each of the plurality of focal lengths into a single image based on the expanded sharpness maps. Higher sharpness areas of a first image of the one or more images of the subject at each of the plurality of focal lengths are weighted above corresponding lower sharpness areas in a second image of the one or more images of the subject at each of the plurality of focal lengths to be more prevalent in the composite image.

Example 4 is the imaging system as in Examples 1-3, further comprising an emitter that emits light toward the subject. At each focal length, the imaging device captures a first image of the subject using a first lighting configuration of the emitter, and a second image of the subject using a second lighting configuration of the emitter that is different than the first lighting configuration.

Example 5 is the imaging system as in Examples 1-4, wherein the controller generates the composite image based on the first images and the second images taken of the subject at the plurality of focal lengths. The controller generates that composite image by generating a combined image for each focal length by blending the first image for a particular focal length with the second image of that focal length, generating a sharpness map for each combined image each sharpness map indicating a sharpness level for each pixel of its corresponding combined image, and generating the composite image by blending the combined images of each of the plurality of focal lengths together into a single image based on the sharpness levels in the sharpness maps.

Example 6 is an imaging system as in Examples 1-5, wherein the emitter is a light ring with the plurality of light sources being disposed at different positions around the light ring.

Example 7 is an imaging system as in Examples 1-6, wherein the first image is a white reference image of the subject while white light from the emitter is incident on the subject as the first lighting configuration, and the second image is a color image of the subject while light of one or more colors from the emitter is incident on the subject as the second lighting configuration.

Example 8 is an imaging system as in Examples 1-7, wherein the controller generates a normal map image for each focal length, indicating surface normals for surfaces of the subject, by comparing the white reference image of a particular focal length to the color image of that focal length.

Example 9 is an imaging system as in Examples 1-8, wherein the controller generates the combined image for each focal length by blending the normal map image for a particular focal length with the white reference image of that focal length, and generates the composite image by blending the combined images of the plurality of focal lengths together into a single image.

Example 10 is an imaging system as in Examples 1-9, further comprising a microscope attached to the imaging device for imaging microscopic subjects.

Example 11 is an imaging system as in Examples 1-10, wherein, for each focal length, the imaging device captures a white reference image of the subject as the first image while white light from the emitter is incident on the subject as the first lighting configuration, a first color image of the subject as the second image while a red light, a green light, and a blue light are emitted from separate light sources of the light ring onto the subject as the second lighting configuration, and one or more additional color images taken of the subject while the red light, the green light, and the blue light are emitted from separate light sources of the light ring onto the subject from one or more positions that are different then in the first color image. The controller generates a first normal map image for each focal length by comparing the white reference image of a particular focal length to the first color image of that focal length. The controller generates a second normal map image for each focal length by comparing the white reference image of a particular focal length to the second color image of that focal length. The controller generates a combined normal map image for each focal length by blending the first normal map image and the second normal map image of that focal length. The controller generates the combined image for each focal length by blending the combined normal map image for a particular focal length with the white reference image of that focal length, and generates the composite image by blending the combined images of the plurality of focal lengths together into a single image.

Example 12 is an imaging system as in Examples 1-11, wherein each of the red light, green light, and blue light are emitted from separate light sources of the light ring simultaneously.

Example 13 is an imaging system as in Examples 1-12, wherein each of the red light, green light, and blue light are emitted from separate light sources of the light ring at positions on the light ring that form a triangular shape.

Example 14 is an imaging system as in Examples 1-13, wherein for the first color image, the red light, green light, and blue light emitted from the light ring together form the triangular shape. For the second color image, the red light, green light, and blue light emitted from the light ring are moved within the triangular shape such that two or more of the red light, green light, and blue light emit from a different position of the triangular shape than for the first color image.

Example 15 is an imaging system as in Examples 1-14, wherein the subject is airborne particulate matter collected for sampling and identification, and the composite image is analyzed by a detector and categorizer to determine the types and levels of particulate contained in the airborne particulate matter.

Example 16 is a method for imaging a subject using an imaging system comprising an imaging device for capturing an image of a subject comprising an imaging device that captures images of the subject, a focus mechanism for changing a focal length of the imaging device, and a controller that processes images captured by the imaging device. The method includes capturing one or more images of the subject at each of a plurality of focal lengths. The method includes generating a sharpness map for each of the one or more images of the subject at each of the plurality of focal lengths, and generating a composite image of the subject by blending together the one or more images at each of the plurality of focal lengths into a single image based on the sharpness maps.

Example 17 is the method as in Example 16 wherein each sharpness map indicates a sharpness level for each pixel of its corresponding image of the one or more images of the subject at each of the plurality of focal lengths, and wherein the blending together the one or more images of the subject at each of the plurality of focal lengths into a single image is based on the sharpness levels in the sharpness maps.

Example 18 is the method as in Examples 16-17, wherein generating each sharpness map comprises determining a sharpness level for each pixel in a particular image of the one or more images of the subject at each of the plurality of focal lengths, generating a raw sharpness map for the particular image of the one or more images of the subject at each of the plurality of focal lengths based on the sharpness levels determined for each pixel, and generating an expanded sharpness map based on the raw sharpness map by creating expanded areas around high sharpness pixels in the raw sharpness map to a size including additional sharpness information surrounding the high sharpness pixels. The generating the composite image of the subject is carried out by blending together the one or more images of the subject at each of the plurality of focal lengths into a single image based on the expanded sharpness maps. Higher sharpness areas of a first image of the one or more images of the subject at each of the plurality of focal lengths are weighted above corresponding lower sharpness areas in a second image of the one or more images of the subject at each of the plurality of focal lengths to be more prevalent in the composite image.

Example 19 is the method as in Examples 16-18, wherein at each focal length the imaging device captures a first image of the subject using a first lighting configuration of the emitter, and a second image of the subject using a second lighting configuration of the emitter that is different than the first lighting configuration.

Example 20 is the method as in Example 16-19, wherein generating the composite image of the subject comprises generating a combined image for each focal length by blending the first image for a particular focal length with the second image of that focal length, generating a sharpness map for each combined image each sharpness map indicating a sharpness level for each pixel of its corresponding combined image, and generating the composite image by blending the combined image of each of the plurality of focal lengths together into a single image based on the sharpness levels in the sharpness maps.

Example 21 is the method as in Examples 16-20, wherein the emitter is a light ring with the plurality of light sources being disposed at different positions around the light ring.

Example 22 is the method as in Examples 16-21, wherein the first image is a white reference image of the subject while white light from the emitter is incident on the subject as the first lighting configuration, and the second image is a color image of the subject while light of one or more colors from the emitter is incident on the subject as the second lighting configuration.

Example 23 is the method as in Examples 16-22, including generating a normal map image for each focal length, indicating surface normals for surfaces of the subject, by comparing the white reference image of a particular focal length to the color image of that focal length.

Example 24 is the method as in Examples 16-23, further comprising generating the combined image for each focal length by blending the normal map image for a particular focal length with the white reference image of that focal length, and generating the composite image by blending the combined images of the plurality of focal lengths together into a single image.

Example 25 is the method as in Examples 16-24, further comprising a microscope attached to the imaging device for imaging microscopic subjects.

Example 26 is the method as in Examples 16-25, wherein, capturing the plurality of images of the subject comprises capturing a white reference image of the subject as the first image while white light from the emitter is incident on the subject as the first lighting configuration, a first color image of the subject as the second image while a red light, a green light, and a blue light are emitted from separate light sources of the light ring onto the subject as the second lighting configuration, and a one or more additional color images taken of the subject while the red light, the green light, and the blue light are emitted from separate light sources of the light ring onto the subject from one or more positions that are different then in the first color image. The method further comprises generating a first normal map image for each focal length by comparing the white reference image of a particular focal length to the first color image of that focal length. The method further comprises generating a second normal map image for each focal length by comparing the white reference image of a particular focal length to the second color image of that focal length. The method further comprises generating a combined normal map image for each focal length by blending the first normal map image and the second normal map image of that focal length. The method further comprises generating the combined image for each focal length by blending the combined normal map image for a particular focal length with the white reference image of that focal length, and generating the composite image by blending the combined images of the plurality of focal lengths together into a single image.

Example 27 is the method as in Examples 16-26, wherein each of the red light, green light, and blue light are emitted from separate light sources of the light ring simultaneously.

Example 28 is the method as in Examples 16-27, wherein each of the red light, green light, and blue light are emitted from separate light sources of the light ring at positions on the light ring that form a triangular shape.

Example 29 is the method as in Examples 16-28, wherein for the first color image, the red light, green light, and blue light emitted from the light ring together form the triangular shape. For the second color image, the red light, green light, and blue light emitted from the light ring are moved within the triangular shape such that two or more of the red light, green light, and blue light emit from a different position of the triangular shape than for the first color image.

Example 30 is the method as in Examples 16-29, wherein the subject is airborne particulate matter collected for sampling and identification, and the composite image is analyzed by a detector and categorizer to determine the types and levels of particulate contained in the airborne particulate matter.

Example 31 is a method for imaging a subject using an imaging system comprising an imaging device for capturing an image of a subject comprising an imaging device that captures images of the subject, a focus mechanism for changing a focal length of the imaging device, an emitter that emits light toward the subject, and a controller that processes images captured by the imaging device. The method includes traversing through a plurality of focal lengths for the imaging device and capturing one or more scoring images of the subject at each of the plurality of focal lengths. The method further includes determining a focus score for one or more pixels in each of the scoring images by comparing the one or more pixels to its neighboring pixels in one or more of vertical, horizontal, and diagonal directions. The method further includes determining a vertical differential between the one or more pixels and its neighboring pixels in the vertical direction, determining a horizontal differential between the one or more pixels and its neighboring pixels in the horizontal direction, and determining the focus score based on the horizontal differential and the vertical differential.

Example 32 is the method as in Example 31, wherein the one or more pixels are compared to one or more neighboring pixel windows, which each include two or more pixels, in one or more of vertical, horizontal, and diagonal directions.

Example 33 is the method as in any of Examples 31-32, the method further including assigning the focus scores of each pixel in a scoring image to one or more buckets that each correspond to a range of focus scores. The method further includes analyzing the focus scores in the one or more buckets using k-means clustering and determining a focus score for each scoring image and determining a scoring level for the scoring image based on a center value of an uppermost cluster found by the k-means clustering.

Example 34 is the method of selecting a plurality of focal lengths for imaging a subject using an imaging system comprising an imaging device for capturing an image of a subject comprising an imaging device that captures images of the subject, a focus mechanism for changing a focal length of the imaging device, an emitter that emits light toward the subject, and a controller that processes images captured by the imaging device. The method includes traversing through a plurality of calculated focus scores for a plurality of scoring images taken at a plurality of focal lengths, using a rough focus mode when focus scores are below a defined threshold, using a coarse focus mode when focus scores are above the defined threshold, and using a fine focus mode when slope of neighboring focus scores changes from increasing to decreasing.

Example 35 is the method as in Example 34, the method further including finding a peak focus value and its associated focal length and selecting a user-set number N of other focal lengths that are spaced a minimum focal distance S from the peak focus score(s) as focal lengths for further imaging and slice generation according to the Examples 1-20.

Example 36 is a method for imaging a subject using an imaging system comprising an imaging device for capturing an image of a subject comprising an imaging device that captures images of the subject, a focus mechanism for changing a focal length of the imaging device, an emitter that emits light toward the subject, and a controller that processes images captured by the imaging device. The method includes traversing through a plurality of focal lengths for the imaging device and capturing one or more scoring images of the subject at each of the plurality of focal lengths. The method further includes determining a focus score for one or more pixels in each of the scoring images by comparing the one or more pixels to its neighboring pixels in one or more of vertical, horizontal, and diagonal directions. The method further includes determining a vertical differential between the one or more pixels and its neighboring pixels in the vertical direction, determining a horizontal differential between the one or more pixels and its neighboring pixels in the horizontal direction, and determining the focus score based on the horizontal differential and the vertical differential. The method further includes generating a raw sharpness map images for each of the plurality of focal lengths which display sharpness levels of each pixel in of the scoring images for each of the plurality of focal lengths, generating a flared sharpness map for each of the plurality of focal lengths based on the raw sharpness maps where high sharpness areas are flared out to include pixels surrounding the high sharpness areas. A plurality of images of the different focal lengths are combined based on the flared sharpness maps in such a way that higher sharpness areas of each image of the different focal lengths is weighted higher to be more prevalent in a final combined image of the plurality of images of the different focal lengths than lower focus areas from other of the plurality of images.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. An imaging system for capturing one or more images of a subject, the imaging system comprising:
   an imaging device that captures images of the subject;
   a focus mechanism for changing a focal length of the imaging device; and
   a controller that processes images captured by the imaging device;
     wherein the imaging device captures a plurality of images of the subject at each of a plurality of focal lengths;
     wherein the controller generates a sharpness map for each of the plurality of images of the subject at each of the plurality of focal lengths; and
     wherein the controller generates a composite image of the subject by blending together the plurality of images at each of the plurality of focal lengths into a single image based on the sharpness maps;
   wherein each sharpness map indicates a sharpness level for each pixel of its corresponding image of the plurality of images of the subject at each of the plurality of focal lengths; and
   wherein the blending together the plurality of images of the subject at each of the plurality of focal lengths into a single image is based on the sharpness levels in the sharpness maps;
   wherein the controller generates each sharpness map by:
     determining a sharpness level for each pixel in a particular image of the plurality of images of the subject at each of the plurality of focal lengths;
     generating a raw sharpness map for the particular image of the plurality of images of the subject at each of the plurality of focal lengths based on the sharpness levels determined for each pixel; and generating an expanded sharpness map based on the raw sharpness map by creating expanded areas around high sharpness pixels in the raw sharpness map to a size including additional sharpness information surrounding the high sharpness pixels; and wherein the controller generates the composite image of the subject by blending together the plurality of images of the subject at each of the plurality of focal lengths into a single image based on the expanded sharpness maps; and wherein higher sharpness areas of a first image of the plurality of images of the subject at each of the plurality of focal lengths are weighted above corresponding lower sharpness areas in a second image of the plurality of images of the subject at each of the plurality of focal lengths to be more prevalent in the composite image.

2. The imaging system of claim 1, further comprising:
a microscope attached to the imaging device for imaging microscopic subjects.

3. The imaging system of claim 1, wherein, for each focal length, the imaging device captures:
a white reference image of the subject as the first image while white light from the emitter is incident on the subject as the first lighting configuration;
a first color image of the subject as the second image while a red light, a green light, and a blue light are emitted from separate light sources of the light ring onto the subject as the second lighting configuration; and
one or more additional color images taken of the subject while the red light, the green light, and the blue light are emitted from separate light sources of the light ring onto the subject from one or more positions that are different then in the first color image; wherein the controller:
generates a first normal map image for each focal length by comparing the white reference image of a particular focal length to the first color image of that focal length;
generates a second normal map image for each focal length by comparing the white reference image of a particular focal length to the second color image of that focal length;
generates a combined normal map image for each focal length by blending the first normal map image and the second normal map image of that focal length
generates the combined image for each focal length by blending the combined normal map image for a particular focal length with the white reference image of that focal length; and
generates the composite image by blending the combined images of the plurality of focal lengths together into a single image.

4. The imaging system of claim 3, wherein each of the red light, green light, and blue light are emitted from separate light sources of the light ring simultaneously.

5. The imaging system of claim 4, wherein each of the red light, green light, and blue light are emitted from separate light sources of the light ring at positions on the light ring that form a triangular shape.

6. The imaging system of claim 5, wherein, for the first color image, the red light, green light, and blue light emitted from the light ring together form the triangular shape; and
for the second color image, the red light, green light, and blue light emitted from the light ring are moved within the triangular shape such that two or more of the red light, green light, and blue light emit from a different position of the triangular shape than for the first color image.

7. The imaging system of claim 1, wherein the subject is airborne particulate matter collected for sampling and identification; and
the composite image is analyzed by a detector and categorizer to determine the types and levels of particulate contained in the airborne particulate matter.

8. An imaging system for capturing one or more images of a subject, the imaging system comprising:
an imaging device that captures images of the subject;
a focus mechanism for changing a focal length of the imaging device; and
a controller that processes images captured by the imaging device;
wherein the imaging device captures a plurality of images of the subject at each of a plurality of focal lengths;
wherein the controller generates a sharpness map for each of the plurality of images of the subject at each of the plurality of focal lengths; and
wherein the controller generates a composite image of the subject by blending together the plurality of images at each of the plurality of focal lengths into a single image based on the sharpness maps;
an emitter that emits light toward the subject; and
wherein, at each focal length, the imaging device captures:
a first image of the subject using a first lighting configuration of the emitter; and
a second image of the subject using a second lighting configuration of the emitter that is different than the first lighting configuration;
wherein the controller generates the composite image based on the first images and the second images taken of the subject at the plurality of focal lengths by:
generating a combined image for each focal length by blending the first image for a particular focal length with the second image of that focal length;
generating a sharpness map for each combined image each sharpness map indicating a sharpness level for each pixel of its corresponding combined image; and
generating the composite image by blending the combined image of each of the plurality of focal lengths together into a single image based on the sharpness levels in the sharpness maps; and
wherein the emitter is a light ring with the plurality of light sources being disposed at different positions around the light ring,
wherein the first image is a white reference image of the subject while white light from the emitter is incident on the subject as the first lighting configuration; and
wherein the second image is a color image of the subject while light of one or more colors from the emitter is incident on the subject as the second lighting configuration.

9. The imaging system of claim 8, wherein the controller:
generates a normal map image, indicating surface normals for surfaces of the subject, for each focal length by comparing the white reference image of a particular focal length to the color image of that focal length.

10. The imaging system of claim 9, wherein the controller:
    generates the combined image for each focal length by blending the normal map image for a particular focal length with the white reference image of that focal length; and
    generates the composite image by blending the combined images of the plurality of focal lengths together into a single image.

11. The imaging system of claim 10, further comprising: a microscope attached to the imaging device for imaging microscopic subjects.

12. The imaging system of claim 8, wherein, for each focal length, the imaging device captures:
    a white reference image of the subject as the first image while white light from the emitter is incident on the subject as the first lighting configuration;
    a first color image of the subject as the second image while a red light, a green light, and a blue light are emitted from separate light sources of the light ring onto the subject as the second lighting configuration; and
    one or more additional color images taken of the subject while the red light, the green light, and the blue light are emitted from separate light sources of the light ring onto the subject from one or more positions that are different then in the first color image; wherein the controller:
        generates a first normal map image for each focal length by comparing the white reference image of a particular focal length to the first color image of that focal length;
        generates a second normal map image for each focal length by comparing the white reference image of a particular focal length to the second color image of that focal length;
        generates a combined normal map image for each focal length by blending the first normal map image and the second normal map image of that focal length
        generates the combined image for each focal length by blending the combined normal map image for a particular focal length with the white reference image of that focal length; and
        generates the composite image by blending the combined images of the plurality of focal lengths together into a single image.

13. The imaging system of claim 12, wherein each of the red light, green light, and blue light are emitted from separate light sources of the light ring simultaneously.

14. The imaging system of claim 13, wherein each of the red light, green light, and blue light are emitted from separate light sources of the light ring at positions on the light ring that form a triangular shape.

15. The imaging system of claim 14, wherein, for the first color image, the red light, green light, and blue light emitted from the light ring together form the triangular shape; and
    for the second color image, the red light, green light, and blue light emitted from the light ring are moved within the triangular shape such that two or more of the red light, green light, and blue light emit from a different position of the triangular shape than for the first color image.

16. An imaging system for capturing one or more images of a subject, the imaging system comprising:
    an imaging device that captures images of the subject;
    a focus mechanism for changing a focal length of the imaging device; and
    a controller that processes images captured by the imaging device;
        wherein the imaging device captures a plurality of images of the subject at each of a plurality of focal lengths;
        wherein the controller generates a sharpness map for each of the plurality of images of the subject at each of the plurality of focal lengths; and
        wherein the controller generates a composite image of the subject by blending together the plurality of images at each of the plurality of focal lengths into a single image based on the sharpness maps; and
    an emitter that emits light toward the subject, wherein the imaging device captures:
        a first image of the subject using a first lighting configuration of the emitter; and
        a second image of the subject using a second lighting configuration of the emitter that is different than the first lighting configuration;
    wherein the first image is a white reference image of the subject while white light from the emitter is incident on the subject as the first lighting configuration; and
    wherein the second image is a color image of the subject while light of one or more colors from the emitter is incident on the subject as the second lighting configuration.

17. The imaging system of claim 16, wherein each sharpness map indicates a sharpness level for each pixel of its corresponding image of the plurality of images of the subject at each of the plurality of focal lengths; and
    wherein the blending together the plurality of images of the subject at each of the plurality of focal lengths into a single image is based on the sharpness levels in the sharpness maps.

18. The imaging system of claim 17, wherein the controller generates each sharpness map by:
    determining a sharpness level for each pixel in a particular image of the plurality of images of the subject at each of the plurality of focal lengths;
    generating a raw sharpness map for the particular image of the plurality of images of the subject at each of the plurality of focal lengths based on the sharpness levels determined for each pixel; and
    generating an expanded sharpness map based on the raw sharpness map by creating expanded areas around high sharpness pixels in the raw sharpness map to a size including additional sharpness information surrounding the high sharpness pixels; and
    wherein the controller generates the composite image of the subject by blending together the plurality of images of the subject at each of the plurality of focal lengths into a single image based on the expanded sharpness maps; and
    wherein higher sharpness areas of a first image of the plurality of images of the subject at each of the plurality of focal lengths are weighted above corresponding lower sharpness areas in a second image of the plurality of images of the subject at each of the plurality of focal lengths to be more prevalent in the composite image.

* * * * *